US 10,659,766 B2

(12) United States Patent
Nobayashi et al.

(10) Patent No.: US 10,659,766 B2
(45) Date of Patent: May 19, 2020

(54) CONFIDENCE GENERATION APPARATUS, CONFIDENCE GENERATION METHOD, AND IMAGING APPARATUS

(71) Applicant: c/o CANON KABUSHIKI KAISHA, Tokyo (JP)

(72) Inventors: Kazuya Nobayashi, Tokyo (JP); Takashi Sasaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 599 days.

(21) Appl. No.: 15/296,525

(22) Filed: Oct. 18, 2016

(65) Prior Publication Data

US 2017/0127048 A1    May 4, 2017

(30) Foreign Application Priority Data

Oct. 30, 2015 (JP) .................................. 2015-214575
Aug. 4, 2016 (JP) .................................. 2016-153521

(51) Int. Cl.
| | |
|---|---|
| *H04N 13/271* | (2018.01) |
| *H04N 13/128* | (2018.01) |
| *H04N 13/218* | (2018.01) |
| *G06T 7/00* | (2017.01) |
| *H04N 13/00* | (2018.01) |

(52) U.S. Cl.
CPC ......... *H04N 13/271* (2018.05); *G06T 7/0002* (2013.01); *H04N 13/128* (2018.05); *H04N 13/218* (2018.05); *G06T 2200/04* (2013.01); *G06T 2207/10028* (2013.01); *G06T 2207/20016* (2013.01); *G06T 2207/20021* (2013.01);

(Continued)

(58) Field of Classification Search
None
See application file for complete search history.

(56) References Cited

U.S. PATENT DOCUMENTS

| 4,667,228 A | 5/1987 | Kawamura et al. |
| 4,965,840 A | 10/1990 | Subbarao |

(Continued)

FOREIGN PATENT DOCUMENTS

| JP | 2756803 B2 | 5/1998 |
| JP | 4280822 B2 | 6/2009 |

(Continued)

OTHER PUBLICATIONS

U.S. Appl. No. 15/144,853, filed May 3, 2016, Kazuya Nobayashi.

*Primary Examiner* — James M Anderson, II
(74) *Attorney, Agent, or Firm* — Venable LLP

(57) ABSTRACT

Provided is a confidence generation apparatus including: an acquisition unit configured to acquire a depth image signal which includes depth information representing a depth to an object in each of a plurality of pixels; and a generation unit configured to generate global confidence which represents confidence in a global region of the depth image signal. The generation unit includes: a first generation processing unit configured to generate local confidence which represents the confidence in the depth information in each of the plurality of pixels; a region division processing unit configured to divide the depth image signal into a plurality of regions based on the depth information; and a second generation processing unit configured to generate the global confidence in each of the plurality of regions based on the local confidence.

27 Claims, 13 Drawing Sheets

(52) U.S. Cl.
   CPC .............. *G06T 2207/30168* (2013.01); *H04N 2013/0081* (2013.01); *H04N 2013/0092* (2013.01)

(56) References Cited

U.S. PATENT DOCUMENTS

| | | | |
|---|---|---|---|
| 5,539,476 | A | 7/1996 | Sasaki |
| 6,100,929 | A | 8/2000 | Ikeda et al. |
| 6,438,566 | B1 | 8/2002 | Okuno et al. |
| 7,671,391 | B2 | 3/2010 | Kawahito |
| 8,619,082 | B1 * | 12/2013 | Ciurea ................. H04N 13/232 345/427 |
| 9,294,668 | B2 | 3/2016 | Nobayashi |
| 9,307,140 | B2 | 4/2016 | Nobayashi |
| 9,451,216 | B2 | 9/2016 | Nobayashi |
| 2006/0291697 | A1 * | 12/2006 | Luo .................... G06K 9/00369 382/104 |
| 2008/0123960 | A1 * | 5/2008 | Kim ......................... G06K 9/38 382/173 |
| 2013/0113881 | A1 * | 5/2013 | Barnum ............... H04N 13/122 348/43 |
| 2013/0215107 | A1 * | 8/2013 | Kimura ................... G06T 15/00 345/419 |
| 2015/0241205 | A1 | 8/2015 | Nobayashi |
| 2015/0302589 | A1 | 10/2015 | Sasaki |
| 2016/0150151 | A1 | 5/2016 | Nobayashi |
| 2016/0273909 | A1 | 9/2016 | Nobayashi |
| 2016/0337576 | A1 | 11/2016 | Nobayashi |

FOREIGN PATENT DOCUMENTS

| | | |
|---|---|---|
| JP | 4915126 B2 | 4/2012 |
| JP | 5066851 B2 | 11/2012 |

* cited by examiner

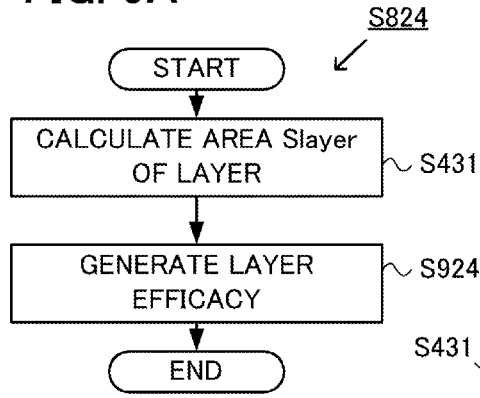
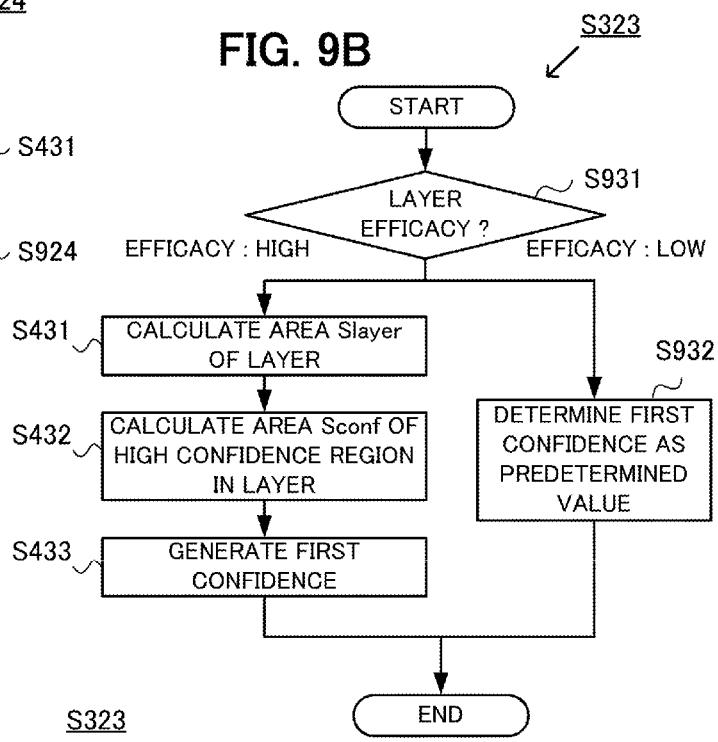
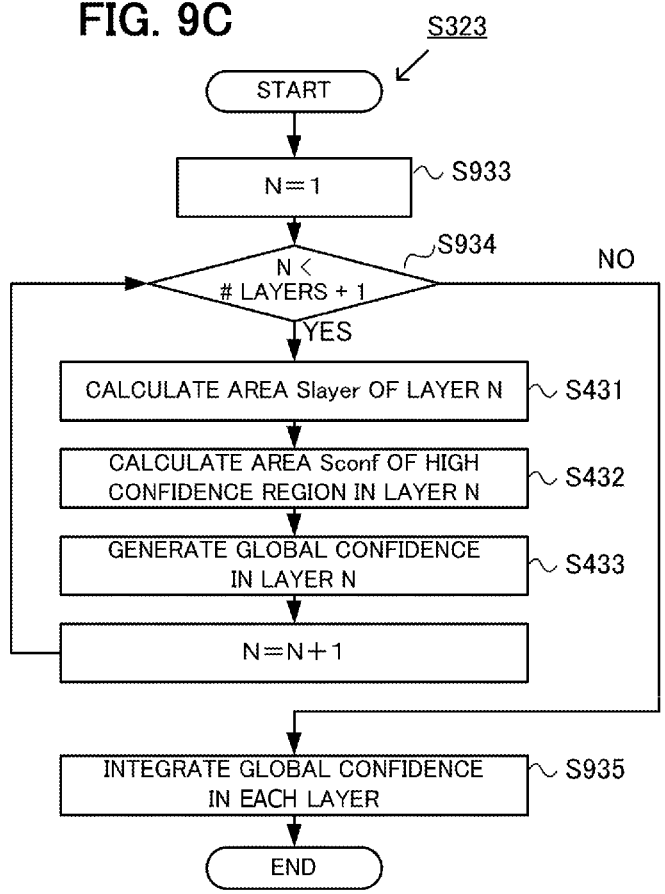

CONFIDENCE GENERATION APPARATUS, CONFIDENCE GENERATION METHOD, AND IMAGING APPARATUS

BACKGROUND OF THE INVENTION

Field of the Invention

The present invention relates to a confidence generation apparatus configured to determine confidence in depth information, and more particularly to a confidence generation apparatus that is used for imaging apparatuses, such as a digital still camera and a digital video camera.

Description of the Related Art

In the field of imaging apparatuses, such as a digital still camera and a digital video camera, an imaging apparatus has been proposed which has a depth measuring function that allows acquiring, along with an ornamental image signal, depth from the imaging apparatus to an object at a plurality of pixel positions (hereafter called "object depth", and an imaging signal constituted by object depths acquired at the plurality of pixel positions is called a "depth image signal").

For example, Japanese Patent No. 4915126 proposes a solid-state image pickup element in which a pixel having a depth measuring function is disposed for a part or all of the pixels of the image pickup element, so as to detect the object depth by a phase difference method. The depth measuring method disclosed in Japanese Patent No. 4915126 is called an "imaging plane phase difference depth measuring method", since the phase difference type depth measurement is performed on the imaging plane. In the case of the imaging plane phase difference depth measuring method, two image signals can be acquired based on the images generated by luminous flux that passed through different pupil regions of the imaging optical system of the imaging apparatus. A relative positional shift amount between the two image signals is detected by a method similar to the parallax amount detection method using stereo images, and is converted into a defocus amount using a predetermined conversion coefficient, whereby the object depth can be acquired. Further, in the imaging plane phase difference depth measuring method, an ornamental image signal can be generated by combining the two image signals.

As another depth measuring method, Japanese Patent No. 2756803 proposes a depth from defocus (DFD) method. In the DFD method, two image signals are acquired in a temporal sequence while changing the image capturing conditions (e.g. aperture value, focal length), and the object depth is acquired based on the difference of the blur amounts between the two images. One image signal, of these two image signals, can be used as an ornamental image signal.

In both of these object depth calculation methods, the object depth is calculated based on the correlation between the two image signals. Generally a region-based matching method is used to evaluate the correlation. According to the region-based matching method, an image signal included in a predetermined collation region is extracted from each image signal, whereby correlation is evaluated. If the correlation of the two images can be evaluated accurately, the object depth can be acquired at high precision, but if not, the object depth may be calculated incorrectly.

In Japanese Patent No. 5066851, regions in which correlation cannot be evaluated are set as regions where the object depth cannot be calculated. In other words, it is locally evaluated whether or not the object depth was calculated for each region size similar to the size of the collation region used for calculating the correlation. Moreover, Japanese Patent No. 5066851 discloses a method for sorting the regions in which the object depth was calculated into a plurality of sub-regions in accordance with the calculated object depth, and for a region in which the object depth cannot be calculated, the object depth is determined by interpolating the object depths in peripheral regions utilizing similarities to the ornamental image signal.

Patent Document 1: Japanese Patent No. 4915126
Patent Document 2: Japanese Patent No. 2756803
Patent Document 3: Japanese Patent No. 5066851
Patent Document 4: Japanese Patent No. 4280822

SUMMARY OF THE INVENTION

In the case of the method disclosed in Japanese Patent No. 5066851, for a region in which the object depth cannot be calculated, the object depth is determined by interpolating the object depths of peripheral regions, based on similarities to the image characteristics acquired from the ornamental image. In other words, for the regions of which image characteristics are similar to one another, the object depths are interpolated based on the assumption that the object depths thereof are also similar to one another. If a region, in which the object depth cannot be calculated, is mostly surrounded by regions in which the object depth can be calculated, a major interpolation error is not likely to occur even if the above mentioned assumption is partially in error. However, if the peripheral regions of a region, in which the object depth cannot be calculated, are also mostly regions of which the object depths cannot be calculated, then the object depth may be interpolated based on incorrect information, which results in a major interpolation error. In such a case, the interpolation processing of the object depths drops the accuracy of the depth image signal.

To prevent a drop in accuracy of the object depth caused by the interpolation processing, an index for determining whether or not the accuracy of the depth image signal will drop because of the interpolation processing, before executing the interpolation processing, is demanded. In other words, an index to globally evaluate the confidence in the depth image signal is demanded.

With the foregoing in view, it is an object of the present invention to generate an index to globally evaluate the confidence in the depth image signal.

A first aspect of the present invention is a confidence generation apparatus for generating confidence in a depth image signal, having: an acquisition unit configured to acquire a depth image signal which includes depth information representing a depth to an object in each of a plurality of pixels; and a generation unit configured to generate global confidence which represents confidence in a global region of the depth image signal. The generation unit includes: a first generation processing unit configured to generate local confidence which represents the confidence in the depth information in each of the plurality of pixels; a region division processing unit configured to divide the depth image signal into a plurality of regions based on the depth information; and a second generation processing unit configured to generate the global confidence in each of the plurality of regions based on the local confidence.

A second aspect of the present invention is a confidence generation method for generating confidence in a depth image signal, executed by a depth image processing apparatus, the method including: an acquisition step of acquiring a depth image signal which includes depth information representing a depth to an object in each of a plurality of pixels; and a generation step of generating global confidence which represents confidence in a global region of the depth image signal. The generation step includes: a first generation processing step of generating local confidence which represents the confidence in the depth information in each of the plurality of pixels; a region division processing step of dividing the depth image signal into a plurality of regions based on the depth information; and a second generation processing step of generating the global confidence in each of the plurality of regions based on the local confidence.

According to the present invention, a global confidence in the depth image signal can be evaluated in the confidence generation apparatus configured to generate global confidence in depth image signals.

Further features of the present invention will become apparent from the following description of exemplary embodiments with reference to the attached drawings.

BRIEF DESCRIPTION OF THE DRAWINGS

FIGS. 9A to 9C are flow charts depicting processing performed by the confidence generation apparatus according to Embodiment 2;

DESCRIPTION OF THE EMBODIMENTS

Embodiment 1

Embodiment 1 of the present invention will now be described in detail with reference to the drawings. In the following description, a digital camera is used as an example of an imaging apparatus that includes a confidence generation apparatus (depth image processing apparatus) of the present invention, but application of the present invention is not limited to this.

In the description with reference to the drawings, a same composing element is denoted with a same reference sign, even if a figure number is different, and redundant description is minimized.

<Configuration of Digital Camera>

Figure 1A:
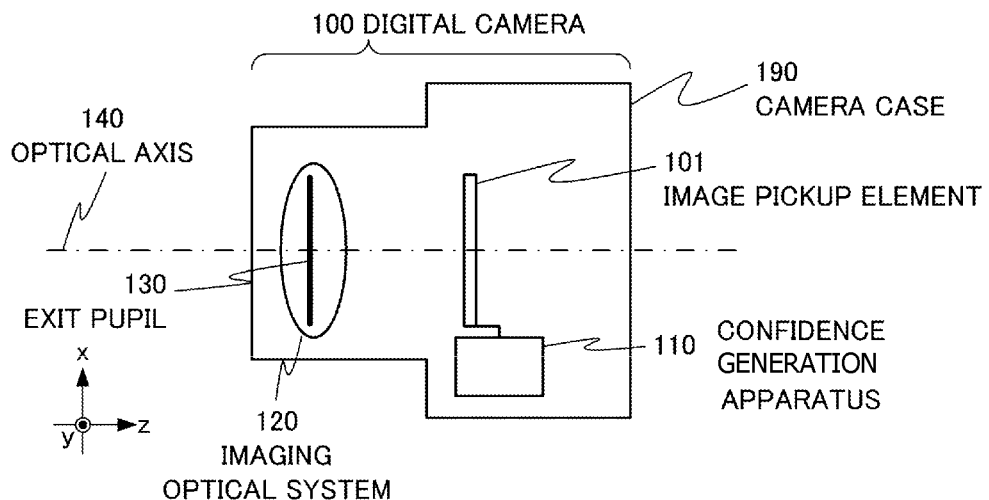
FIGS. 1A to 1C are diagrams depicting an imaging apparatus which includes a confidence generation apparatus according to Embodiment 1.

FIG. 1A shows a digital camera 100 which includes a confidence generation apparatus 110 according to this embodiment. The digital camera 100 is constituted by an imaging optical system 120, an image pickup element 101, the confidence generation apparatus 110, an image generation unit (not illustrated), a lens driving control unit (not illustrated), and an image signal storage unit (not illustrated), which are disposed inside a camera case 190. The confidence generation apparatus 110 can be constructed by a logic circuit. The confidence generation apparatus 110 may also be constituted by a central processing unit (CPU) and a memory for storing computing programs.

The imaging optical system 120 is an image capturing lens of the digital camera 100, and has a function to form an image of an object on the image pickup element 101. The imaging optical system 120 is constituted by a plurality of lens groups (not illustrated), and has an exit pupil 130 at a position that is distant from the image pickup element 101 by a predetermined distance. The reference number 140 in FIG. 1A denotes an optical axis of the imaging optical system 120. In this description, the optical axis 140 is parallel with the z axis. The x axis and the y axis are perpendicular to each other, and are perpendicular to the optical axis.

<Configuration of Image Pickup Element>

The image pickup element 101 is constituted by a complementary metal oxide semiconductor (CMOS) or a charge-coupled device (CCD), and has a depth measuring function based on the imaging plane phase difference depth measuring method. An object image formed on the image pickup element 101 via the imaging optical system 120 is converted photoelectrically by the image pickup element 101, whereby an image signal based on the object image is generated. An ornamental image signal is generated by the image generation unit performing development processing on the acquired image signal. The generated ornamental image can be stored in the image signal storage unit. The image pickup element corresponds to an image acquisition unit configured to acquire an ornamental image signal and an image signal used for depth measurement. The image pickup element 101 according to this embodiment will now be described in detail with reference to FIG. 1B.

Figure 1B:
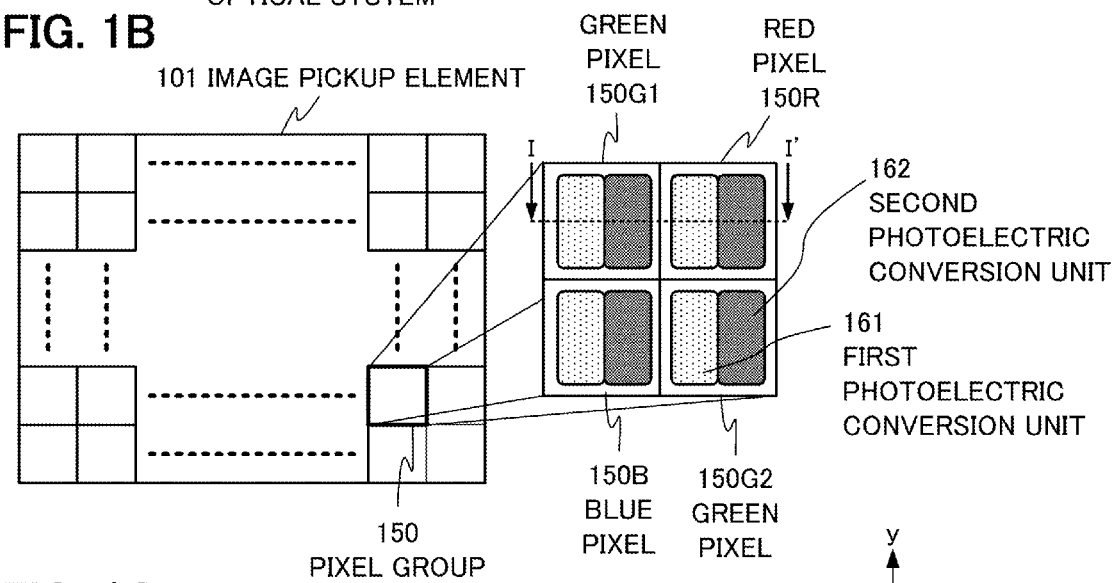

FIG. 1B is an xy cross-sectional view of the image pickup element 101. The image pickup element 101 is constituted by arrays of a plurality of 2 rows×2 columns pixel groups 150. The pixel group 150 is constituted by green pixels 150G1 and 150G2 disposed diagonally, and a red pixel 150R and a blue pixel 150B disposed on the other two pixels.

Figure 1C:
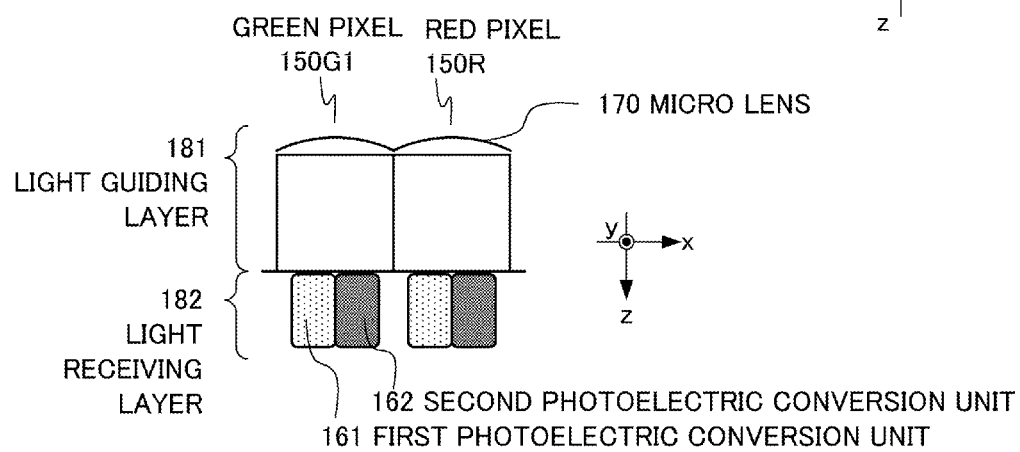

FIG. 1C is a schematic diagram depicting the I-I' cross-section of the pixel group 150. Each pixel is constituted by a light receiving layer 182 and a light guiding layer 181. In the light receiving layer 182, two photoelectric conversion units (first photoelectric conversion unit 161, second photoelectric conversion unit 162), for photoelectrically converting the received light, are disposed. In the light guiding layer 181, a micro lens 170 for efficiently guiding the luminous flux, which entered the pixel into the photoelectric conversion unit, a color filter (not illustrated) configured to pass through the light having a predetermined wavelength band, wirings (not illustrated) for reading an image and driving the pixel and the like are disposed.

<Depth Measurement Principle of Imaging Plane Phase Difference Depth Measuring Method>

The luminous flux, which is received by the first photoelectric conversion unit 161 and the second photoelectric conversion unit 162 of the image pickup element 101 of this embodiment, will be described with reference to FIG. 2A.

Figure 2A:
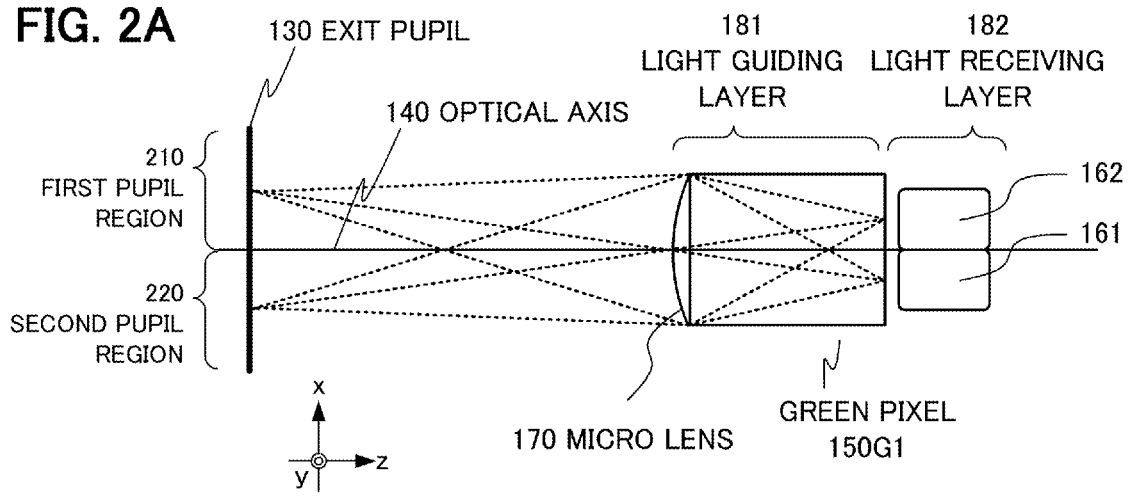
FIGS. 2A to 2D are diagrams depicting a luminous flux received by an image pickup element and positional shift amount according to Embodiment 1.

FIG. 2A is a schematic diagram depicting only the exit pupil 130 of the imaging optical system 120, and the green pixel 150G1 as an example representing the pixels disposed in the image pickup element 101. The micro lens 170 in the pixel 150G1 shown in FIG. 2A is disposed so that the exit pupil 130 and the light receiving layer 182 become optically conjugate. As a result, as shown in FIG. 2A, the luminous flux, that passed through a first pupil region (210) included in the exit pupil 130, enters the first photoelectric conversion unit 161. In the same manner, the luminous flux, which passed through a second pupil region (220), enters the second photoelectric conversion unit 162.

A plurality of first photoelectric conversion units 161 disposed in each pixel generate a first image signal by photoelectrically converting the received luminous flux. In the same manner, a plurality of second photoelectric conversion units 162 disposed in each pixel generate a second image signal by photoelectrically converting the received luminous flux. An intensity distribution of an image, which the luminous flux mainly passed through the first pupil region 210 forms on the image pickup element 101, can be acquired from the first image signal; and an intensity distribution of an image, which luminous flux mainly passed through the second pupil region 220 forms on the image pickup element 101, can be acquired from the second image signal.

Figure 2B:
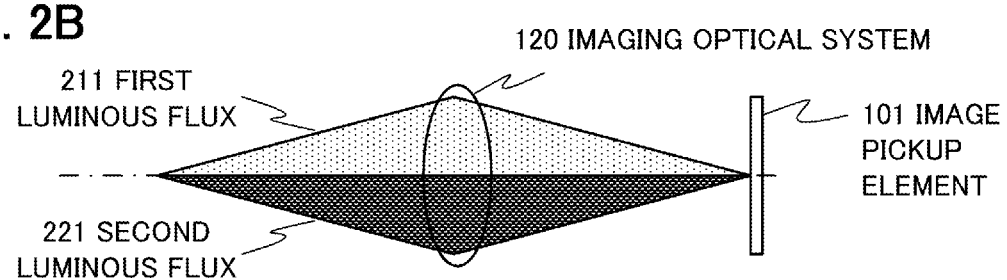
Figure 2C:
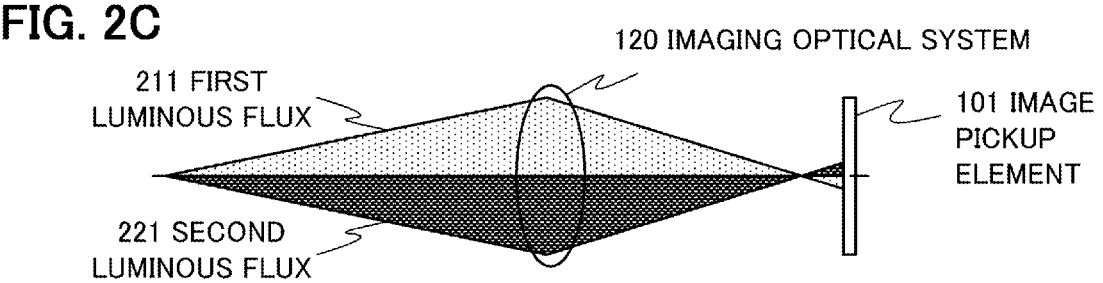
Figure 2D:
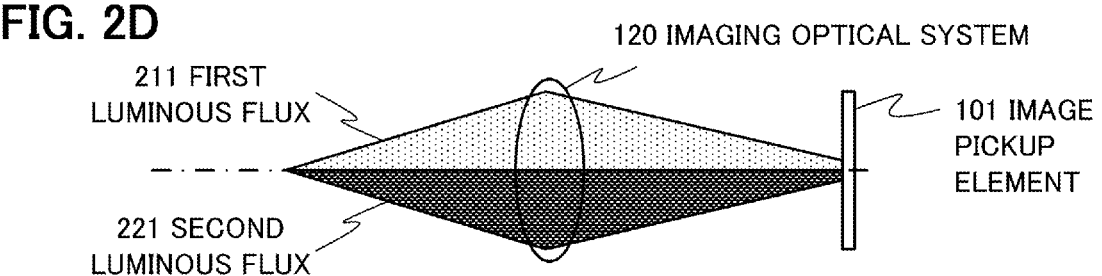

The relative positional shift amount between the first image signal and the second image signal is an amount in accordance with the defocus amount. The relationship between the positional shift amount and the defocus amount will be described with reference to FIGS. 2B to 2D. FIGS. 2B to 2D are schematic diagrams depicting the image pickup element 101 and the imaging optical system 120 of this embodiment. The reference number 211 in FIGS. 2B to 2D denotes the first luminous flux that passes through the first pupil region 210, and the reference number 221 denotes the second luminous flux that passes through the second pupil region 220.

FIG. 2B shows a focused stated where the first luminous flux 211 and the second luminous flux 221 converge on the image pickup element 101. In this case, the relative shift amount between the first image signal formed by the first luminous flux 211 and the second image signal formed by the second luminous flux 221 is 0. FIG. 2C shows a defocused state in the negative direction of the z axis on the image side. In this case, the relative positional shift amount between the first image signal formed by the first luminous flux and the second image signal formed by the second luminous flux is not 0 but a negative value. FIG. 2D shows a defocused state in the positive direction of the z axis on the image side. In this case, the relative shift amount between the first image signal formed by the first luminous flux and the second image signal formed by the second luminous flux is not 0 but a positive value.

Comparing FIG. 2C and FIG. 2D, it is known that the direction of positional shift changes depending on whether the defocus amount has a positive value or a negative value. It is also known that the positional shift is generated in accordance with the image forming relationship (geometric relationship) of the imaging optical system depending on the defocus amount. Therefore if the positional shift amount between the first image signal and the second image signal is detected by a region-based matching method, which will be described later, the detected positional shift amount can be converted into the defocus amount using a predetermined conversion coefficient. The conversion from the defocus amount on the image side into the object depth on the object side can be easily performed using the image forming relationship of the imaging optical system 120. The conversion coefficient, to convert the positional shift amount into the defocus amount, can be determined based on the dependency of the light receiving sensitivity of the pixels of the image pickup element 101 on the incident angle, the shape of the exit pupil 130, and the distance of the exit pupil 130 from the image pickup element 101.

<Description on Confidence Generation Apparatus>

Figure 3A:
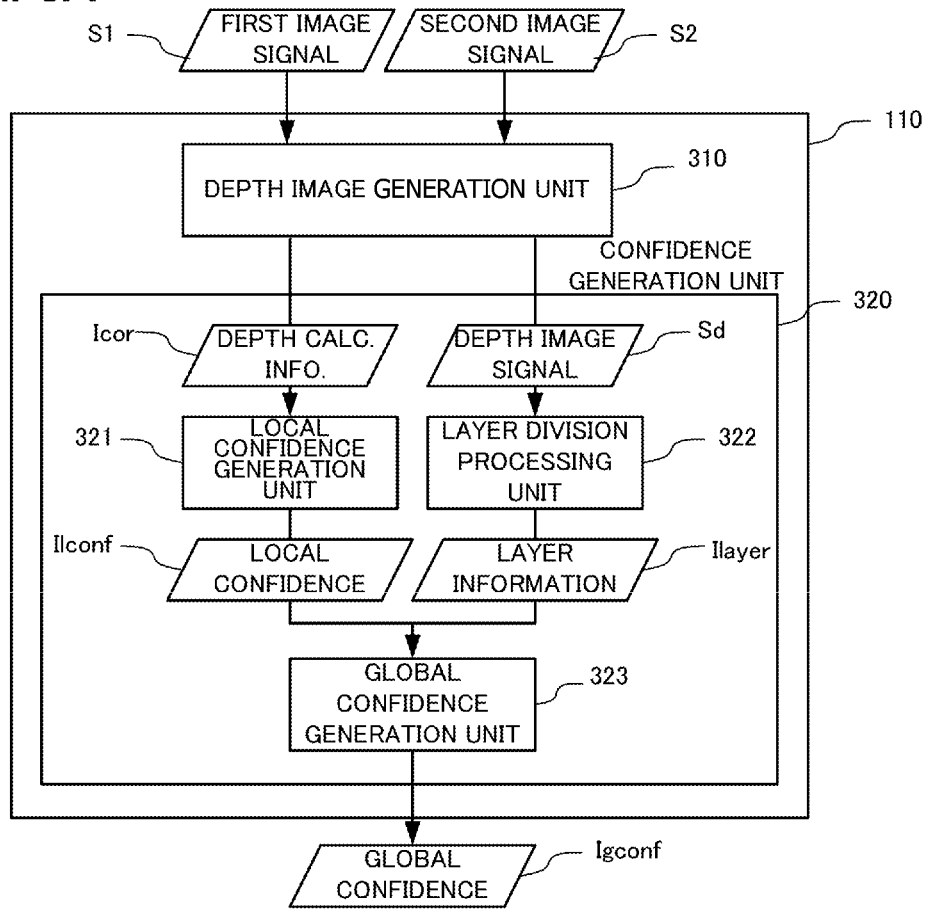
FIGS. 3A and 3B are diagrams depicting the confidence generation apparatus according to Embodiment 1.
Figure 3B:
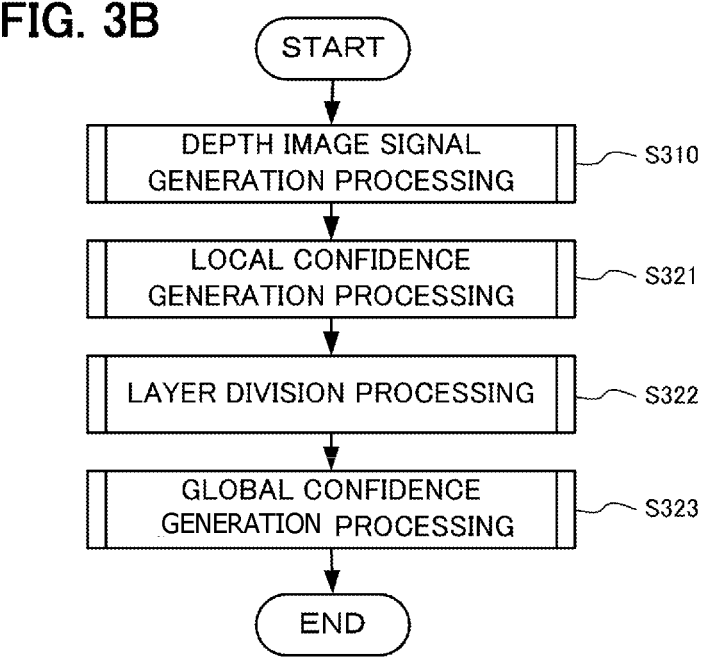

The confidence generation apparatus of this embodiment will now be described. FIG. 3A is a block diagram depicting a general configuration of the confidence generation apparatus 110 of this embodiment, and FIG. 3B is a flow chart depicting an operation of the confidence generation apparatus 110.

The confidence generation apparatus 110 generates a depth image signal Sd in a depth image generation unit (acquisition unit), and generates a global confidence (first confidence) Igconf in a confidence generation unit (generation unit) 320. The specifics of a concrete processing performed by the depth image generation unit 310 and the confidence generation unit 320 will now be described.

Figure 4A:
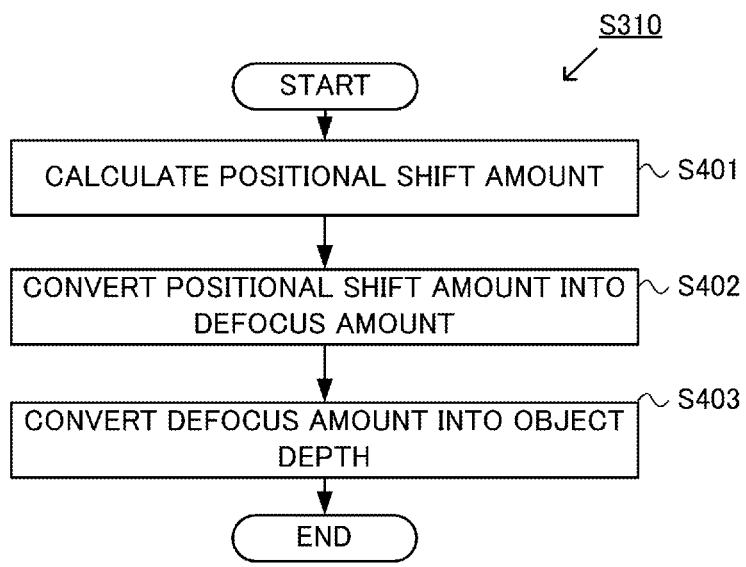
FIGS. 4A to 4E are flow charts depicting processing performed by the confidence generation apparatus according to Embodiment 1.

The depth image generation unit 310 acquires a first image signal S1 and a second image signal S2 from the image pickup element 101, and calculates an object depth at a plurality of pixel positions in a depth image signal generation processing S310, whereby the depth image signal Sd is generated. The specifics of the concrete processing of the depth image signal generation processing S310 will be described with reference to FIG. 4A.

In step S401, the depth image generation unit 310 calculates a relative positional shift amount between the first image signal S1 and the second image signal S2. In concrete terms, the depth image generation unit 310 sets a point of interest in the first image signal S1, and sets a collation region centered around the point of interest. The collation region is a square of which one side has a predetermined number of pixels, and of which the center is the point of interest, for example. The depth image generation unit 310 sets a reference point in the second image signal S2, and sets a reference region centered around the reference point. The reference region has the same size and shape as the collation region. The depth image generation unit 310 calculates the correlation degree between the first image signal S1 included in the collation region, and the second image signal S2 included in the reference region, while sequentially moving the reference point, and determines a reference point having the highest correlation as a corresponding point which corresponds to the point of interest. The relative positional shift amount between the point of interest and the corresponding point is the positional shift amount at the point of interest. By calculating the positional shift amount while sequentially moving the point of interest, the depth image generation unit 310 can calculate the positional shift amount at a plurality of pixel positions. To calculate the correlation degree, a known method can be used, such as normalized cross-correlation (NCC) for evaluating normalized cross-correlation between image signals, or sum of absolute difference (SAD) for evaluating the absolute sum of the differences between image signals.

In step S402, the depth image generation unit 310 converts the positional shift amount into the defocus amount, which is a distance from the image pickup element 101 to the focal point of the imaging optical system 120, using a predetermined conversion coefficient. When the predetermined conversion coefficient is Gain, the defocus amount is $\Delta L$, and the positional shift amount is d, the image shift amount d can be converted into the defocus amount ΔL using the following Expression (1).

$$\Delta L = \text{Gain} \times d \quad (1)$$

To convert from the defocus amount into the object depth, the image forming relationship of the imaging optical system 120 can be used, as mentioned above. By performing the object depth calculation processing in FIG. 4A at a plurality of pixel positions, the depth image signal Sd can be generated.

Figure 5A:
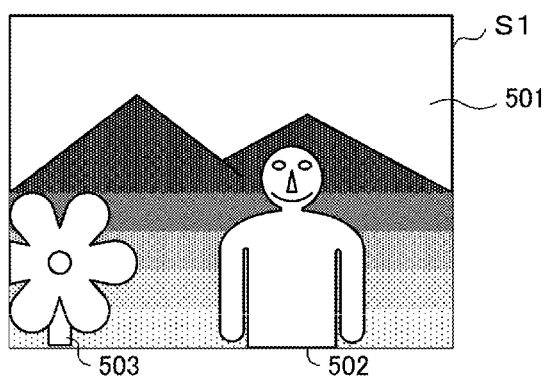
FIGS. 5A to 5F are diagrams depicting confidence generation processing according to Embodiment 1.
Figure 5B:
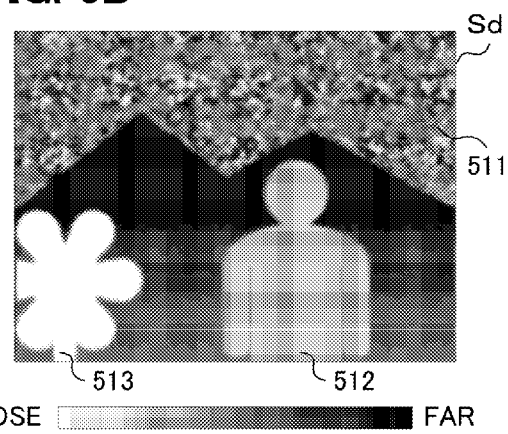

For example, the depth image generation unit 310 can generate the depth image signal Sd shown in FIG. 5B from the first image signal S1 shown in FIG. 5A. The schematic in FIG. 5A shows a portrait image example. The first image signal S1 includes a sky 501, an individual 502 which is a main object, and a plant 503 which is in the foreground. Although an illustration of the second image signal S2 is omitted here, the second image signal S2 has an almost identical composition as the first image signal S1, and has a positional shift generated in accordance with the object depth.

FIG. 5B shows the depth image signal Sd corresponding to the first image signal S1. In FIG. 5B, the region 511 shows the object depth distribution of the region corresponding to the sky 501, the region 512 shows the object depth distribution of the individual 502, and the region 513 shows the object depth distribution of the plant 503. In FIG. 5B, as the color is darker (closer to black), the object depth becomes longer. The object depth in the region 511 in FIG. 5B is greatly dispersed because the object depth cannot be calculated accurately in the sky 501, where the contrast change is minimal.

In the above description, the positional shift amount is converted into the object depth using the defocus amount which was converted using Expression (1), but the positional shift amount may be directly converted into the object depth by one conversion processing. Then the computing volume required for converting into the object depth can be reduced. For the depth information representing the depth to the object, the object depth need not always be used, but any value that can be converted into the object depth may be used. For example, a positional shift amount, defocus amount or a value generated by normalizing one of these values by a predetermined constant may be used as the depth information representing the depth to the object.

A local confidence generation unit (first generation processing unit) 321 in the confidence generation unit 320 generates local confidence (second confidence) Ilconf representing the local likelihood of the object depth, using the depth calculation information Icor acquired from the depth image generation unit 310. The specifics of the concrete processing of the local confidence generation processing S321 to generated the local confidence Ilconf will be described with reference to FIG. 4B.

In step S411, the local confidence generation unit 321 acquires the depth image signal Sd as the depth calculation information Icor. The depth calculation information Icor is information based on which local confidence of the depth value of each pixel in the depth image signal Sd is calculated, and is information which the depth image generation unit 310 calculates in the depth image generation processing. In this embodiment, a case of using the depth image signal Sd as the depth calculation information Icor is described, but information other than the depth image signal Sd may be used as the depth calculation information Icor, as mentioned later.

In step S412, the local confidence generation unit 321 calculates the variance of the depth values in the depth calculation information Icor (that is, the depth image signal Sd), as the local confidence Ilconf. In concrete terms, the local confidence generation unit 321 sets the point of interest in the acquired depth calculation information Icor, and calculates the variance of the depth values included in the reference region centered around the point of interest, as the local confidence Ilconf. The reference region here has the same size and shape as the reference region when the positional shift was calculated in the depth image signal generation processing S310, but either one of the size and the shape may be different.

In a region where the noise amount included in the first image signal S1 or the second image signal S2 is higher with respect to the contrast change of the object (that is, the image SN ratio is low), the dispersion of the object depth increases because of an evaluation error of correlation. This means that as the variance is higher, the local confidence of the object depth is lower. Therefore in this embodiment, as the value of the local confidence Ilconf is higher, the confidence in the depth value is lower.

Figure 5C:
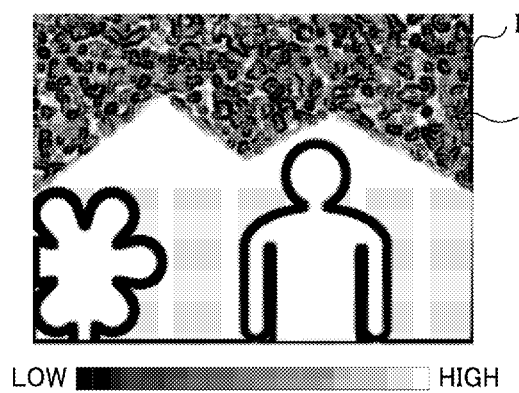

FIG. 5C is a diagram showing the local confidence Ilconf determined from the depth image signal Sd shown in FIG. 5B. FIG. 5C shows that as the color is darker, confidence in the object depth is lower. As shown in FIG. 5B, the variance of the depth values is high in the region 511 corresponding to the sky 501, and the variance of the depth values is low in the other regions. Therefore as shown in FIG. 5C, many regions of which local confidence in the object depth is low are included in the region 521 corresponding to the sky 501, and hardly any region, of which confidence in the object depth is low, is included in the other regions.

The layer division processing unit (region division processing unit) 322 in the confidence generation unit 320 divides the depth image signal Sd acquired from the depth image generation unit 310 into two layers (main object layer and foreground/background layer), and generates the layer information Ilayer. The specifics of the concrete processing of the layer division processing S322, for generating the layer information Ilayer, will be described with reference to FIG. 4C.

Figure 5D:
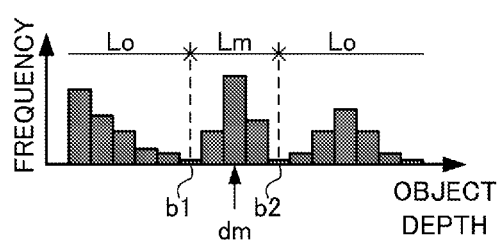

In step S421, the layer division processing unit 322 calculates the frequency distribution of the object depth based on the depth image signal Sd. FIG. 5D shows an example of the frequency distribution of the object depth. In FIG. 5D, the abscissa indicates the object depth, and the ordinate indicates the frequency.

In step S422, the layer division processing unit 322 sets a plurality of boundary values for dividing layers based on the frequency distribution information. In this embodiment, the depth image signal Sd is divided into two layers (main object layer and foreground/background layer), hence the layer division processing unit 322 respectively sets the boundary value for the front side and the rear side of a depth range that includes the main object. In concrete terms, the layer division processing unit 322 sets two object depth values of which frequency is low (e.g. minimum frequency) as the boundary values on the front side and the rear side of the depth values of the main object. In this embodiment, the layer division processing unit 322 sets the boundary value b1 for the front side of a main object depth dm and the boundary b2 for the rear side thereof, so as to divide the depth image signal Sd into the main object layer which is a layer including the main object, and the foreground/background layer which is a layer including the foreground and the background, other than the main object layer. In concrete terms, the layer division processing unit 322 sets two depth values, as the boundary values b1 and b2, which are closest to the main object depth dm and of which frequency is the minimum value. In normal photography, the focal point of the imaging optical system 120 is often on the main object. Therefore the main object depth dm is preferably an object depth corresponding to defocus amount=0.

Figure 5E:
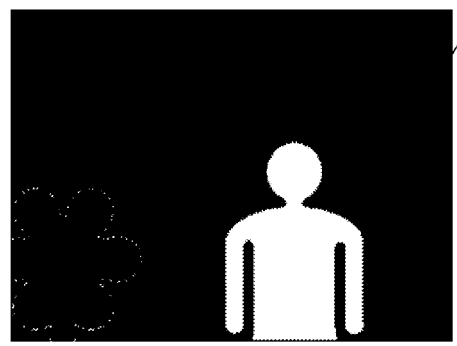

In step S423, the layer division processing unit 322 divides the depth image signal Sd into two layers (main object layer and foreground/background layer) based on the boundary values, and generates the layer information Ilayer. The layer information Ilayer is information that indicates the correspondence of each pixel of the depth image signal Sd and a layer to which the pixel belongs. FIG. 5E shows the layer information Ilayer generated based on the boundary values b1 and b2. The region of which object depth is b1 or more and b2 or less is shown as the main object layer (white region), and the other regions are shown as the foreground/background layers (black regions). For the main object layer, the individual 502 is the main selection. The main object depth dm need not always be the object depth corresponding to defocus amount=0. If the main object occupies most of the first image signal S1, the depth of which frequency in the frequency distribution is highest may be regarded as the main object depth dm. A depth of which frequency is highest (the maximum) in the frequency distribution when the defocus amount is around 0, may be regarded as the main object depth dm.

The layer division processing S322 is regarded as a processing to divide the depth image signal into a plurality of regions, as shown in FIG. 5E (in this case, the region of the main object layer and regions other than the region of the main object layer) based on the object depth. The term "layer" (main object layer or foreground/background layer) herein below includes the region(s) of this layer in the depth image signal.

The global confidence generation unit (second generation processing unit) 323 in the confidence generation unit 320 calculates the global confidence Igconf, for each layer (region), which represents the confidence of the global region of the depth image signal Sd, based on the local confidence Ilconf and the layer information Ilayer. The specifics of the concrete processing of the global confidence generation processing S323 for generating the global confidence Igconf will be described with reference to FIG. 4D. The global region is a region constituted by a plurality of pixels, and a specific size thereof is not especially limited. The region of each layer acquired in the layer division processing S322 corresponds to the global region respectively. In this embodiment, the global confidence Igconf is calculated for each layer, but a method of calculating the global confidence Igconf of the main object layer will be described herein below to simplify description.

In step S431, the global confidence generation unit 323 calculates an area Slayer of the main object layer. In concrete terms, the global confidence generation unit 323 counts the number of pixels included in the region, which was set as the main object layer in the layer division processing S322, and regards the result as the area of the main object layer.

In step S432, the global confidence generation unit 323 calculates an area Sconf of the region, which is within the main object layer, and which was determined that the local confidence Ilconf is higher than a predetermined threshold confidence. To calculate the area Sconf, the number of pixels is counted and regarded as the area of the region, just like the case of the area Slayer.

In step S433, the global confidence generation unit 323 calculates the ratio of the confident regions with respect to the main object layer, as the global confidence Igconf. The global confidence Igconf can be any value based on the ratio of the area Slayer of the layer and the area Sconf of the high confident region, and can be calculated by Expression (2), for example.

$$Igconf = Sconf/Slayer \quad (2)$$

In the above description, the method for calculating the global confidence in the main object layer was described, but a global confidence in the foreground/background layer can be determined in the same manner. In other words, the ratio of the locally confident region to the area of the foreground/background layer can be determined as the global confidence in the foreground/background layer using Expression (2).

The global confidence Igconf, which the confidence generation apparatus 110 of this embodiment generated for the depth image signal Sd shown in FIG. 5B, becomes as follows.

Igconf of main object layer=0.87
Igconf of foreground/background layer=0.50

In the confidence generation apparatus 110 of this embodiment, the global confidence Igconf of the foreground/background layer becomes a low value, hence it is determined that the confidence in the depth image signal Sd of the foreground/background layer is low. By comparing with a predetermined threshold (e.g. 0.8), it can be determined whether the value of the global confidence Igconf is high or low. This predetermined threshold can be appropriately set, and may be changed in according with the scene.

Figure 11A:
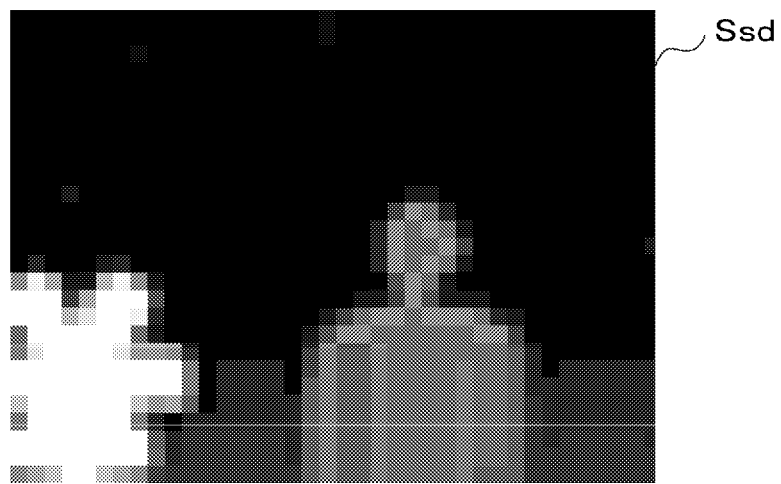
FIGS. 11A to 11C are diagrams depicting a modification of the confidence generation processing.
Figure 11B:
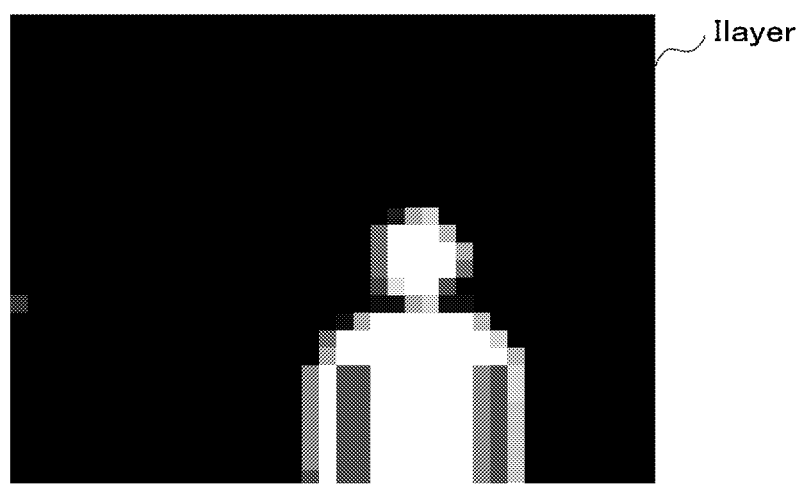
Figure 11C:
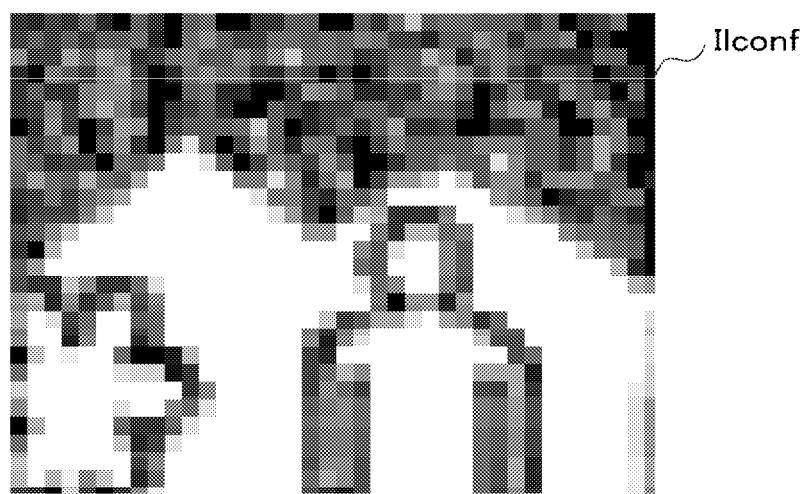

In the confidence generation apparatus 110 of this embodiment, the global confidence is directly determined using the depth image signal Sd generated by the depth image generation unit 310. However, in order to reduce the computing volume, the global confidence may be determined using a reduced depth image signal Ssd which is generated by reducing the depth image signal Sd. FIG. 11A is a reduced depth image signal Ssd generated by skipping pixels from the depth image signal Sd shown in FIG. 5B, so that the number of pixels in the horizontal direction becomes ¹⁄₁₀ and the number of pixels in the horizontal direction becomes ¹⁄₁₀ that of the depth image signal Sd. FIG. 11B shows the layer information Ilayer generated using the reduced depth image signal Ssd. FIG. 11C shows the local confidence Ilconf corresponding to the reduced depth image signal Ssd. The global confidence Igconf generated by the global confidence generation unit 323, using the local confidence Ilconf shown in FIGS. 11B and 11C and the layer information Ilayer, becomes as follows.

Igconf of main object layer=0.87
Igconf of foreground/background layer=0.51

Even if the reduced depth image signal Ssd is used, the global confidence Igconf, equivalent to the case of using the depth image signal Sd, can be acquired. By using the reduced depth image signal Ssd, the computing volume for calculating an area Slayer of the layer and an area Sconf of the high confidence region can be reduced.

In the case of the depth image generation unit 310 of the confidence generation apparatus 110 of this embodiment, it is not always necessary to calculate the object depth for all the pixel positions in the first image signal S1. For example, in some cases, calculating the object depth may not be possible in a peripheral region of the first image signal S1, because the size of the collation region is limited. On the other hand, if the image processing, such as adding the blur amount to the first image signal S1 based on the depth image signal Sd, is performed in the subsequent step, it is preferable to match the number of pixels of the depth image signal Sd and that of the first image signal S1. In this case, the number of pixels is matched by interpolating the peripheral region of the depth image signal Sd using the provided values (e.g. 0). If a region for which the object depth is not calculated (uncalculated region) exists in the depth image signal Sd, it is preferable to calculate the global confidence Igconf only in the regions that exclude the uncalculated region.

The local confidence Ilconf is information where local confidence in the object depth is two dimensionally distributed. Therefore confidence in each pixel can be evaluated, but it is difficult to determine the global confidence in the depth image signal Sd. The confidence generation apparatus 110 of this embodiment generates the global confidence Igconf, using the global confidence generation unit 323, for each layer divided by the layer division processing unit 322, hence an index to evaluate the global confidence in the depth image signal Sd for each layer, can be provided.

<Other Examples of Local Confidence Generation Unit 321>

In order to accurately calculate the global confidence Igconf in the confidence generation apparatus 110 of this embodiment, the local confidence in the object depth, generated by the local confidence generation unit 321, must be evaluated accurately. A modification of the method of calculating the local confidence Ilconf will be described.

Figure 4B:
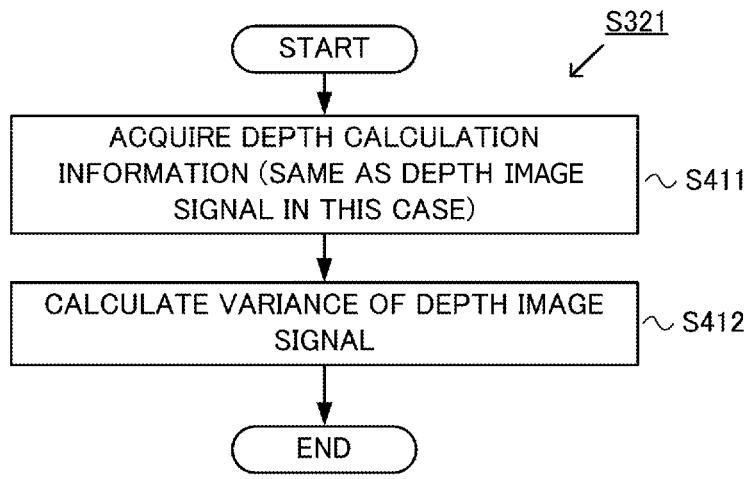

As described with reference to FIG. 4B, in the local confidence generation processing S321 of FIG. 3B, the local confidence in the depth image signal Sd is evaluated based on the variance of the depth image signal Sd. This is because generally in a local region, the object depth is approximately the same and the variance is minimal, therefore if the variance of the depth values is high, the calculation accuracy of the object depth is regarded as low. Possible causes for the drop in the accuracy in calculating the object depth are: the contrast change of the object is low, and the noise amount included in the first image signal S1 or the second image signal S2 is high. The above mentioned method of determining the local confidence Ilconf based on the variance can be regarded as a method of indirectly evaluating how low the contrast change is, or how high the noise amount is. Other than the above method, the local confidence Ilconf may be determined by directly evaluating how low the contrast change is, or how high the noise amount is. Now two methods of determining the local confidence Ilconf by directly evaluating the image SN ratio, which is a ratio of the magnitude of the contrast change of the image and the noise amount, will be described with reference to FIGS. 7A and 7B.

Figure 7A:
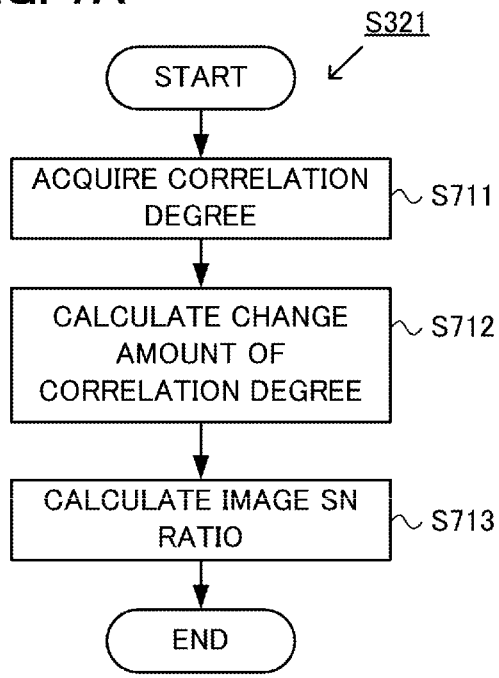
FIGS. 7A to 7C are diagrams depicting a modification of a local confidence calculation method.

A first modification of the method for calculating the local confidence Ilconf will be described with reference to FIG. 7A. In step S711, the local confidence generation unit 321 acquires, as the depth calculation information Icor, the correlation degree information when the depth image signal Sd is calculated from the depth image generation unit 310. This correlation degree information is a correlation degree between a point of interest, which was set when the positional shift amount was calculated in step S401 in the depth image signal generation processing S310 performed by the depth image generation unit 310, and a corresponding point. If the correlation degree is low, it is highly probable that an error has occurred when the correlation was evaluated, because of the influence of noise or the like included in the image signal. In other words, the correlation degree between the point of interest and the corresponding point can be regarded as the index to represent the noise amount included in the image signal.

In step S712, the local confidence generation unit 321 acquires the correlation degree of the neighboring point of the corresponding point, acquired when the positional shift amount was calculated in step S401, as the depth calculation information Icor, and calculates the change amount (difference) between the correlation degree of the neighboring point of the correspondence point and the correlation degree of the corresponding point. The correlation degree of the neighboring point of the corresponding point may be a correlation degree at a pixel adjacent to the corresponding point, or may be a correlation degree at a pixel distant from the corresponding point by a predetermined number of pixels, or may be an average correlation degree of a plurality of pixels around the corresponding point. If the contrast change of the object is small, the change amount of the correlation degree becomes small. In other words, it is highly probable that an error has occurred during the calculation of correlation when the change amount of the correlation degree is small. The change amount of the correlation degree can be regarded as an index representing the contrast change in the image signal.

In step S713, the local confidence generation unit 321 calculates the ratio of the contrast change to the noise amount (SN ratio of the image) as the local confidence Ilconf. As the contrast change is larger, the change amount of the correlation degree is larger. Moreover, as the noise amount is higher, the correlation degree at the corresponding point is lower. Therefore, the local confidence Ilconf should be generated to be higher as the change amount of the correlation degree is higher, and to be higher as the correlation degree at the corresponding point is higher. For example, the local confidence Ilconf is calculated by: (change amount of correlation degree)/(1−correlation degree at corresponding point).

Figure 7B:
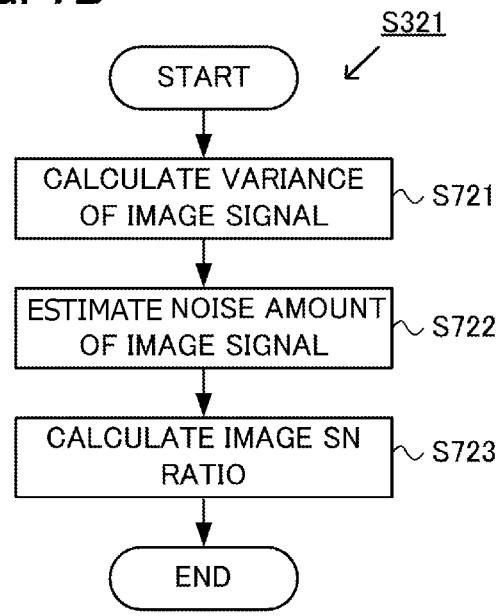

A second modification of the method for calculating the local confidence Ilconf will be described with reference to FIG. 7B. From the depth image generation unit 310, the local confidence generation unit 321 acquires the size of the collation region used for calculating the depth image signal Sd, and at least one of the first image signal S1 and the second image signal S2, as the depth calculation information Icor. In the following description, it is assumed that the first image signal S1 and the size of the collation region were received as the depth calculation information Icor.

In step S721, the local confidence generation unit 321 calculates the variance in order to evaluate the magnitude of the contrast change of the first image signal S1 included in the collation region. The local likelihood of the object depth is higher as the magnitude of the contrast change of the first image signal S1 is higher in the direction connecting the center of gravity of the first pupil region 210 and the center of gravity of the second pupil region 220 (x direction). In other words, when the variance is calculated, the signal string, which is included in the collation region and disposed along the x direction, is extracted from the first image signal S1, whereby the variance is calculated. By sequentially moving the extraction position in the y direction, a plurality of variance values are calculated. Then, the sum of these plurality of variance values calculated in the collation region is calculated, so as to be integrated into one variance value. As the variance value is greater, the magnitude of the contrast change of the first image signal, included in the collation region, increases.

In step S722, the local confidence generation unit 321 estimates the noise amount included in the image signal based on the pixel value of the first image signal S1 included in the collation region. The noise amount included in the image signal is estimated as: noise amount=noise estimation coefficient×pixel value×ISO sensitivity. The noise amount is in proportion to the pixel value here, because the light shot noise amount that is generated during the photoelectric conversion is in proportion to the square root of the number of photons, and because the magnitude of the contrast change is evaluated using the variance in step S721. The noise amount estimation coefficient is determined by measuring the noise characteristic of the image pickup element 101 in advance. For the ISO sensitivity, the ISO sensitivity used for photographing with the digital camera 100 is used. To estimate the noise amount most accurately, it is preferable to consider the read noise of the image pickup element 101 and the dark current shot noise, in addition to the light shot noise. In the case where the pixel value is small, the influence of noise, other than the light shot noise, is large, hence it is preferable to estimate the noise amount using an expression in which the pixel values asymptotically approach a linear function as the pixel value increases, but a pixel value that is small has a value greater than the liner function. An example of such a noise amount estimation expression is: noise amount=ISO sensitivity×[(noise estimation coefficient $1)^2$+(noise estimation coefficient 2×pixel value)$^2$]$^{1/2}$. To reduce the computing volume, an expression where the noise amount increases in accordance with the linear function when the pixel value exceeds a predetermined threshold, may be used, such as: noise amount=ISO sensitivity×max (noise estimation coefficient 1, noise estimation coefficient 2×pixel value). The noise estimation coefficient 1 and the noise estimation coefficient 2 can be determined by measuring the noise characteristic of the image pickup element 101 in advance.

In step S723, the local confidence generation unit 321 calculates the local confidence Ilconf, based on the ratio of the variance determined in step S721 to the noise amount determined in step S722. The local confidence Ilconf can be determined as the above mentioned ratio of the variance to the noise, for example.

As mentioned above, using the methods shown in FIGS. 7A and 7B, the local confidence Ilconf can be determined by directly evaluating the image SN ratio, which is a ratio of the magnitude of the contrast change of the image to the noise amount. In the case of using these methods, the confidence of the depth value is higher as the value of the local confidence Ilconf is larger. In step S721, the variance of the signal string, extracted from the first image signal S1, is calculated, but the standard deviation may be calculated as an index to evaluate the contrast. In this case, in step S722, the noise amount can be calculated assuming that the noise amount is in proportion to the square root of the pixel value.

Another factor in calculating the value of the object depth incorrectly is that the object is a periodic object, in which the brightness saturation at which the pixel values saturate during photography and the contrast change of the object periodically change. Therefore in order to more accurately evaluate the local confidence in the object depth generated by the local confidence generation unit 321, it is preferable to use one or both of the brightness saturation and the periodicity of the object, in addition to the image SN ratio.

The brightness saturation can be calculated as a ratio of a region, in which at least the brightness of one of the first image signal S1 and the second image signal S2 is saturated, with respect to the collation region. If the brightness saturation is used, the local confidence generation unit 321 must acquire at least one of the first image signal S1 and the second image signal S2 as the depth calculation information Icor.

Figure 7C:
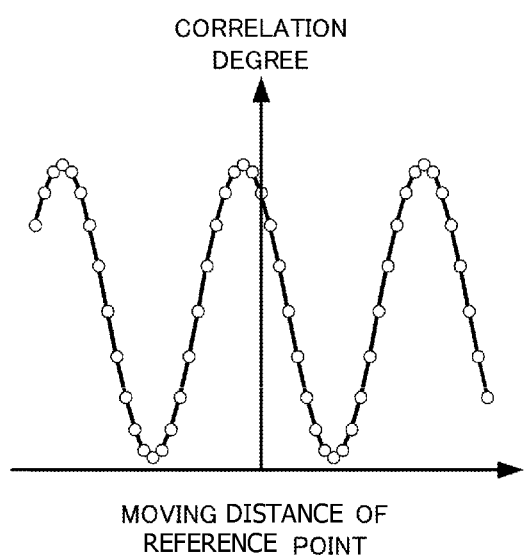

The periodicity of the object can be evaluated based on the correlation degree change pattern when the reference point is moved. FIG. 7C is a graph showing the relationship between the correlation degree and the moving distance of the reference point when the periodic object is photographed. In the case of photographing a periodic object, the correlation degree periodically reaches the maximum value, reflecting the periodic change of contrast. Therefore it can be determined whether or not the object is a periodic object by evaluating whether the moving distance of the reference point, at which the correlation degree has the maximum value, appears periodically. If the periodicity of the object is used, the local confidence generation unit 321 must acquire the correlation degree information to calculate the depth image signal Sd as the depth calculation information Icor. The correlation degree information here is not only the correlation degree between the point of interest and the corresponding point, but also includes the correlation degree between the point of interest and a plurality of reference points around the corresponding point.

The local confidence generation unit 321 of this embodiment determines the brightness saturation and object periodicity, in addition to the image SN ratio, and calculates the local confidence Ilconf. Thereby the local likelihood of the object depth can be evaluated more accurately, and global confidence in the depth image signal Sd in the global confidence generation unit 323 can be evaluated at high precision. Depending on the object and the photographing conditions, it is not necessary to use all of the image SN ratio, the brightness saturation and the object periodicity, for the local confidence Ilconf may be calculated using at least one of these.

<Other Examples of Layer Division Processing Unit 322>

Figure 4C:
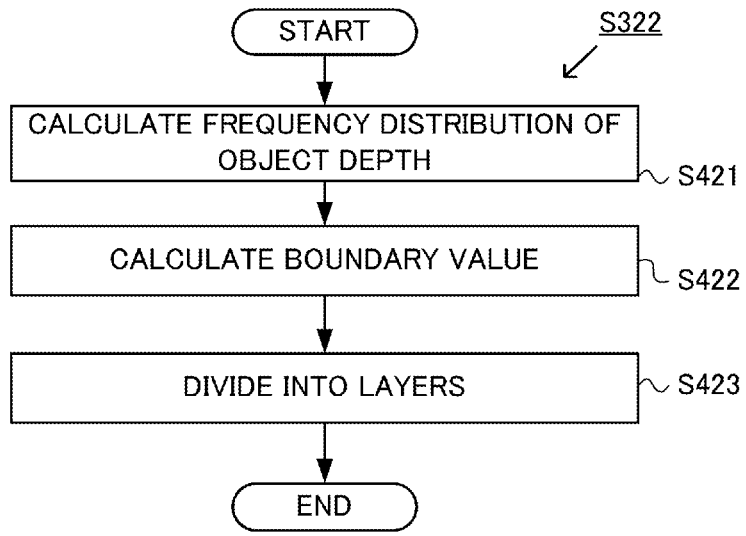
Figure 4D:
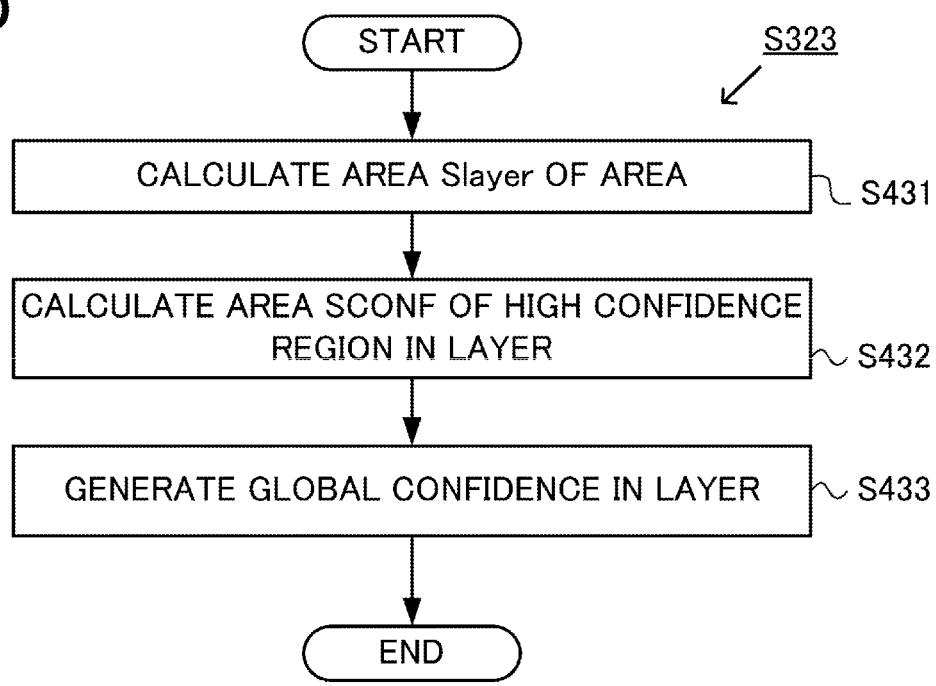

The layer division processing performed by the layer division processing unit 322 of the confidence generation apparatus 110 of this embodiment is not limited to the description in FIG. 4C. The concrete method of the layer division processing described above can be modified in various ways.

For example, as a concrete method for dividing the depth image signal Sd into the main object layer and the foreground/background layer, the following methods can be used other than the above mentioned method.

If the size of the main object in the depth direction (object depth direction) is known, it is not necessary to calculate the frequency distribution of the object depth, but the layer division may be performed by determining the boundary value b1 and the boundary value b2 based on the main object depth and the size of the main object in the depth direction (boundary information). In the case of the portrait shown in FIG. 5A, the size of the individual 502 in the depth direction is estimated to be 50 cm at the most. In such a case, the representative value of the object depth of the individual 502 is calculated, then the range of the representative value of ±25 cm is regarded as the main object layer, and the other regions are regarded as the foreground/background layer.

Even in the case where the depth image signal Sd is not the object depth, but a value that is convertible to the object depth, the range of the main object layer can be calculated in the same manner. For example, if the depth image signal Sd is constituted by a defocus amount, the representative value of the defocus amount of the individual 502 is calculated, and the range of the defocus amount, to become the main object layer, is calculated using the longitudinal magnification of the imaging optical system 120.

The layer division processing unit 322 need not always divide the depth image signal Sd into the layer that include the main object (main object layer) and the layer of the other regions (foreground/background layer). For example, if the plant 503 is focused on, the depth image signal Sd may be divided into a layer that includes the plant 503 and a layer of the other regions, or if the sky 501 is focused on, the depth image signs Sd may be divided into a layer of a region that includes the sky 501 and a layer of the other regions.

In this embodiment, the depth image signal Sd is divided into two layers (main object layer and the foreground/background layer), but the number of layers into which the depth image signal Sd is divided should be two or more layers, and may be three or five layers, for example. To divide the depth image signal Sd into three layers, the depth image signal Sd may be divided into a main object layer that includes the main object, a foreground layer that is a region on the front side of the main object layer, and a background layer that is a region on the rear side of the main object layer. In concrete terms, each layer can be defined as follows using the boundary values b1 and b2.

Foreground layer: region in which object depth is shorter than b1

Main object layer: region in which object depth is b1 or more and b2 or less

Background layer: region in which object depth is longer than b2

Figure 5F:
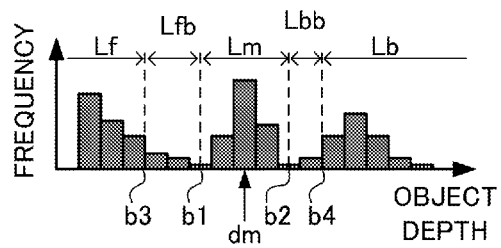

To divide the depth image signal Sd into five layers, four boundary values should be calculated in step S422 of the layer division processing S322 shown in FIG. 4C. In concrete terms, in the frequency distribution of the object depth shown in FIG. 5F, a boundary value b3 is set on the side where the object depth is shorter than the boundary value b1, and a boundary value b4 is set on the side where the object depth is longer than the boundary value b2. The boundary value b3 and the boundary value b4 can be set as values distant from the boundary value b1 and the boundary value b2 by predetermined values respectively. Or, the boundary value b3 and the boundary value b4 may be set on the rear side of the boundary value b1, or on the front side of the boundary value b2 in positions where the increase/decrease of the frequency is greater than a predetermined threshold. In step S423 in FIG. 4C, the layer information Ilayer in the case of dividing the depth image signal Sd into five layers using four boundary values, is generated.

Foreground layer: region in which object depth is shorter than b3

Foreground side intermediate layer: region in which object depth is b3 or more and less than b1

Main object layer: region in which object depth is b1 or more and b2 or less

Background side intermediate layer: region in which object depth is more than b2 and b4 or less Background layer: region in which object depth is longer than b4

When the depth image signal Sd is divided into five layers, it is not always necessary to determine four boundary values, but may be divided into five layers, regarding each intermediate layer as a layer within a predetermined depth including the boundary value b1 or b2.

By increasing the number of divided layers from two to three, the global confidence Igconf in each layer (the layer corresponding to the layer including the main object, the layer corresponding to the foreground, and the layer corresponding to the background) can be generated. As a result, in the case of the example shown in FIGS. 5A to 5C, the global confidence Igconf in the background layer including the sky 501 becomes low, and the global confidence Igconf in the other layers becomes high, therefore it is known that the confidence is low only in the background layer of the depth image signal Sd. If the number of divided layers is increased to five by disposing an intermediate layer between the foreground layer and the main object layer, and between the main object layer and the background layer respectively, the influence of a setting error of boundary values used for the layer division can be reduced.

In the above description, cases of dividing the depth image signal Sd into two, three and five layers were described, but the number of layers may be four or six, adding a layer corresponding to the infinite depth. If the number of layers in the layer division is too high, the area of each layer becomes small, which leads to calculation errors of the global confidence Igconf. Therefore it is preferable that the difference between the boundary values is set to be larger than the depth resolution of the depth image signal Sd. It is more preferable that the number of layers in the layer division is ten layers or less.

<Other Examples of Global Confidence Generation Unit 323>

In the above mentioned global confidence generation processing S323, when the global confidence Igconf is determined for each layer, an area Sconf of the region, which is a value to indicate that the local confidence Ilconf is a reliable value, is calculated. In this processing, the local confidence is converted into binary information using a predetermined threshold, and then the ratio of the high confidence region in each layer is calculated. Therefore, depending on whether the local confidence is higher or lower than a threshold, the value of the local confidence Ilconf may be set to 1 or 0 (e.g. 1 is low confidence; 0 is high confidence), whereby an area of the region indicating high confidence may be determined.

The global confidence Igconf may be generated using multi-value information as the local confidence Ilconf, without binarizing it as mentioned above. By using the multi-value information as the local confidence Ilconf, the global confidence in the depth image signal Sd can be evaluated more accurately.

Figure 4E:
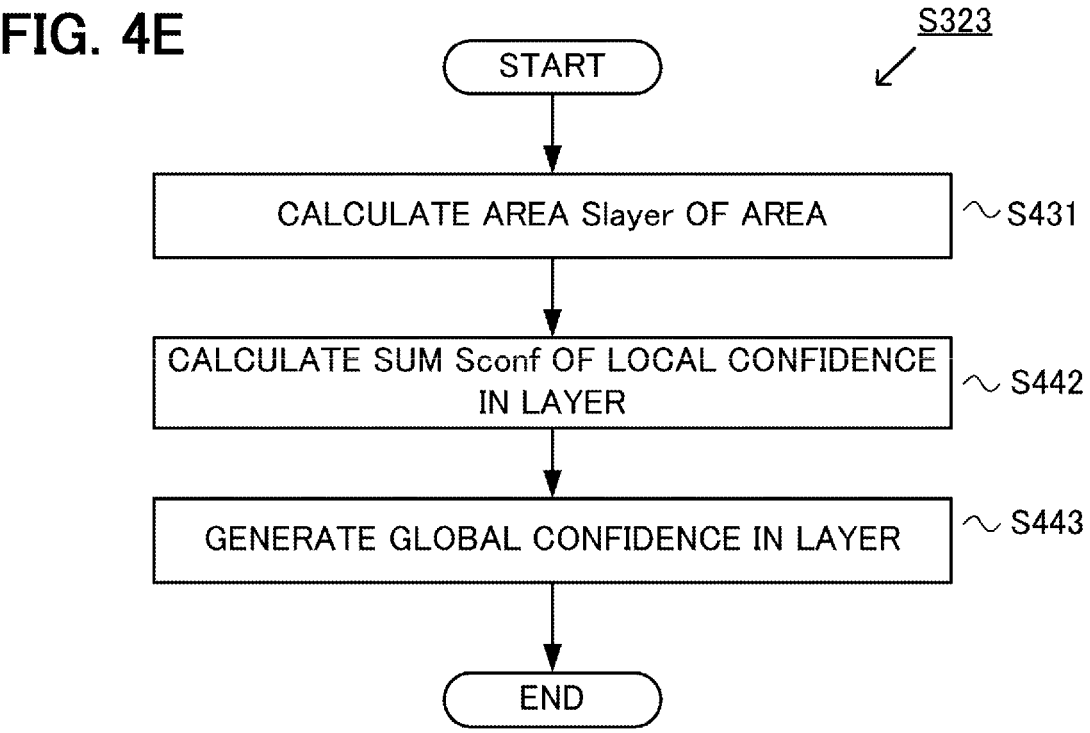

To use the multi-value information as the local confidence Ilconf, the global confidence generation unit 323 performs the global confidence generation processing S323 shown in FIG. 4E. In step S442 in FIG. 4E, the global confidence generation unit 323 calculates the sum of the values of the local confidence Ilconf included in the main object layer, as Sconf. In step S443, the global confidence generation unit 323 generates the global confidence Igconf based on the ratio of an area of the layer Slayer to Sconf. For example, the global confidence Igconf can be calculated using Expression (2). If the local confidence Ilconf is calculated as the variance of the depth image Signal Sd, as shown in FIG. 4B, the confidence is lower as the value is greater. Therefore if the global confidence Igconf is generated using Expression (2), the global confidence of the layer is lower as this value is greater. The correspondence between the generated global confidence Igconf and the actual global confidence is determined by the local confidence Ilconf. To more easily handle the global confidence Igconf, it is preferable that the local confidence Ilconf is normalized using a predetermined constant and rounded off in advance, so that the maximum value becomes 1, and to perform conversion so that the confidence in the object depth becomes lower as the value is lower. In concrete terms, the local confidence Ilconf', converted using Expression (3), should be used.

$$Ilconf'=(1-Ilconf/C) \quad (3)$$

Here it is assumed that Ilconf'=0 if Ilconf', calculated by the above expression, is a negative value. C here denotes a predetermined normalization constant.

In this embodiment, the global confidence Igconf is determined for each layer, but one global confidence may be determined for the depth image by integrating the global confidence Igconf in each layer. The integrated global confidence can be a statistic (e.g. at least one of: minimum value, maximum value, mean value, median value, standard deviation, variance) of the global confidence in each layer. However, considering robustness, the integrated global confidence is preferably a minimum value of the global confidence in each layer.

<Other Examples of Depth Calculation Method>

Figure 6A:
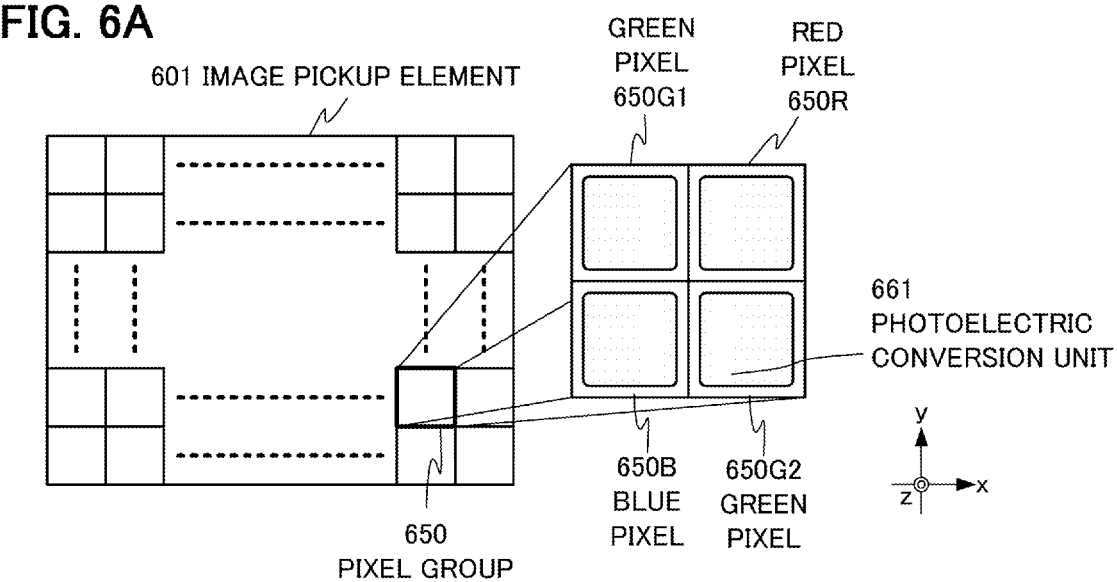
FIGS. 6A to 6D are diagrams depicting a modification of an image pickup element and a depth calculation method.

In the digital camera 100 of this embodiment, the object depth is calculated by the imaging plane phase difference depth measuring method, using the image pickup element 101, in which two photoelectric conversion units are disposed in one pixel, but the object depth may be calculated based on other depth measuring principles. In the digital camera 100 of this embodiment, the object depth may be calculated based on a first image signal and a second image signal, which were captured while changing the image capturing conditions using an image pickup element 601 of which xy cross-section view is shown in FIG. 6A. The DFD method can be used as a concrete depth calculation method. In this modification, the depth image signal Sd is generated by the depth image generation unit 310 shown in FIG. 3A, according to the processing details which will be described later with reference to FIG. 6D.

The image pickup element 601 in FIG. 6A is constituted by a plurality of pixel groups 650, each of which has pixels disposed in 2 rows×2 columns. In the pixel group 650, a green pixel 650G1 and a green pixel 650G2 are disposed diagonally, and a red pixel 650R and a blue pixel 650B are disposed in the other two pixels. Only one photoelectric conversion unit 661 is disposed in each pixel.

Figure 6B:
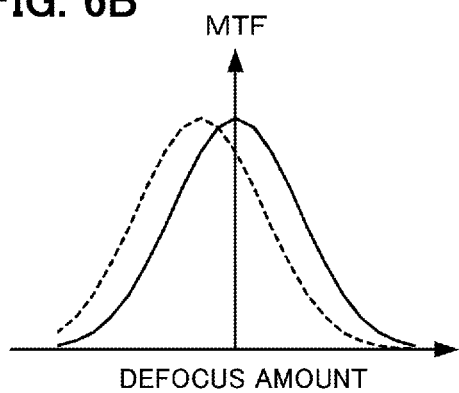
Figure 6C:
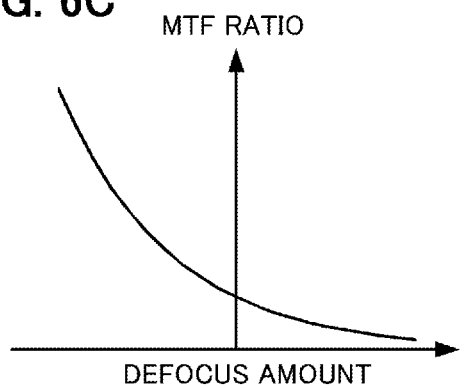

In FIG. 6B, the solid line shows the modulation transfer function (MTF) of the first imaging condition when the focusing position is changed as a photographing condition, and the broken line shows the MTF of the second imaging condition. The abscissa indicates the defocus amount, and the ordinate indicates the MTF. By capturing images consecutively in a time series while changing the focusing position, the object can be imaged while changing the dependency of the MTF on the defocus amount between the first imaging condition and the second imaging condition. FIG. 6C shows the ratio of the MTF of the first imaging condition to the MTF of the second imaging condition. As FIG. 6C shows, the MTF ratio changes depending on the defocus amount. In the DFD method, the correlation between the first image signal captured under the first imaging condition and the second image signal captured under the second imaging condition is evaluated, whereby the difference of the MTF (that is, the difference of burr amounts) is calculated, and the defocus amount is detected. The detected focus amount is converted into the object distance based on the image forming relationship of the imaging optical system 120, just like the above mentioned imaging plane phase difference depth measuring method, whereby the object depth can be calculated.

Figure 6D:
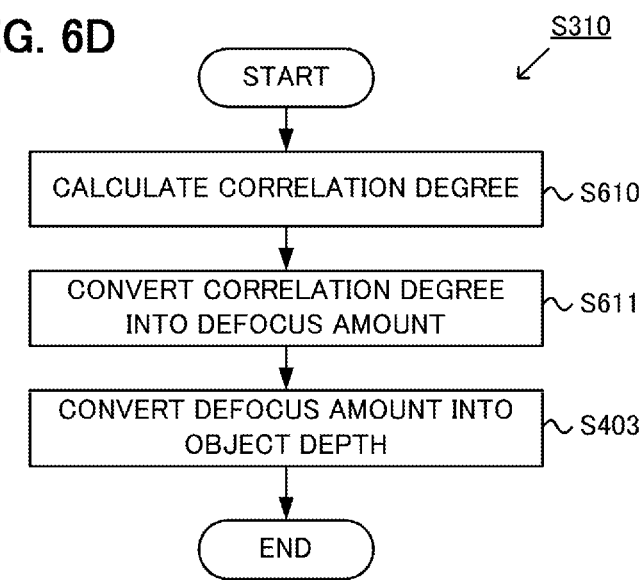

FIG. 6D is a flow chart depicting the processing content performed by the depth image signal generation processing S310 of the depth image generation unit 310. In step S610, the correlation degree between the first image signal and the second image signal is calculated. In other words, a point of interest is set in the first image signal, and a collation region centered around the point of interest is set. Then a reference point is set in a position corresponding to the point of interest in the second image signal, and a reference region centered around the reference point is set. Then the correlation degree between the first image signal included in the collation region and the second image signal included in the reference region is calculated. In step S611, the correlation degree is converted into the defocus amount. To convert the correlation degree into the defocus amount, a lookup table, listing the correspondence, is stored in the memory (not illustrated) of the digital camera 100 in advance, and is referred to. For example, when the correlation degree is high (when the correlation degree is close to 1 in the case of using NCC), the blur amount of the first image signal and that of the second image signal are approximately the same, and the defocus amount is indicated by the intersection of the solid line and the broken line in FIG. 6B. In step S403, the processing to convert the defocus amount into the object depth is performed, just like FIG. 4A.

Even in the case of using the DFD method as the object depth calculation method, the global confidence generation unit 323, constituting the confidence generation apparatus 110 of this embodiment, can generate the global confidence Igconf for each layer. By the global confidence Igconf, the global confidence in the depth image signal Sd can be evaluated for each layer using a single index.

For the depth image generation unit 310 of the confidence generation apparatus 110 of the present invention, a method that is different from the image plane phase difference depth measuring method or the DFD method may be used, as long as the depth image signal Sd constituted by the information indicating the object depth at a plurality of pixel positions can be generated. For example, as shown in Japanese Patent No. 4280822, the time of flight (TOF) method of measuring the depth to the object by irradiating light and measuring the time until the reflected light is received, may be used. In the case of the TOF method, measuring the object depth is difficult in the region in which the depth to the object is long, since the reflected light intensity is low. Therefore it is preferable to add information generated based on the reflected light intensity, in addition to the information generated based on the variance of the depth image signal Sd, as the local confidence Ilconf.

Embodiment 2

A confidence generation apparatus 810 according to Embodiment 2 of the present invention will now be described. In this embodiment, the confidence generation apparatus 810 generates the layer efficacy Ieff, which indicates the efficacy of the layer information Ilayer generated by the layer division processing unit 322, and calculates the global confidence Igconf using the layer efficacy Ieff as well. By using the information to indicate the efficacy of the layer information Ilayer, the global confidence in the depth image signal Sd, using the global confidence Igconf generated by the global confidence generation unit 323, can be evaluated more accurately. The layer efficacy Ieff can be regarded as the region efficacy which indicates the efficacy of the region corresponding to the layer.

Figure 8A:
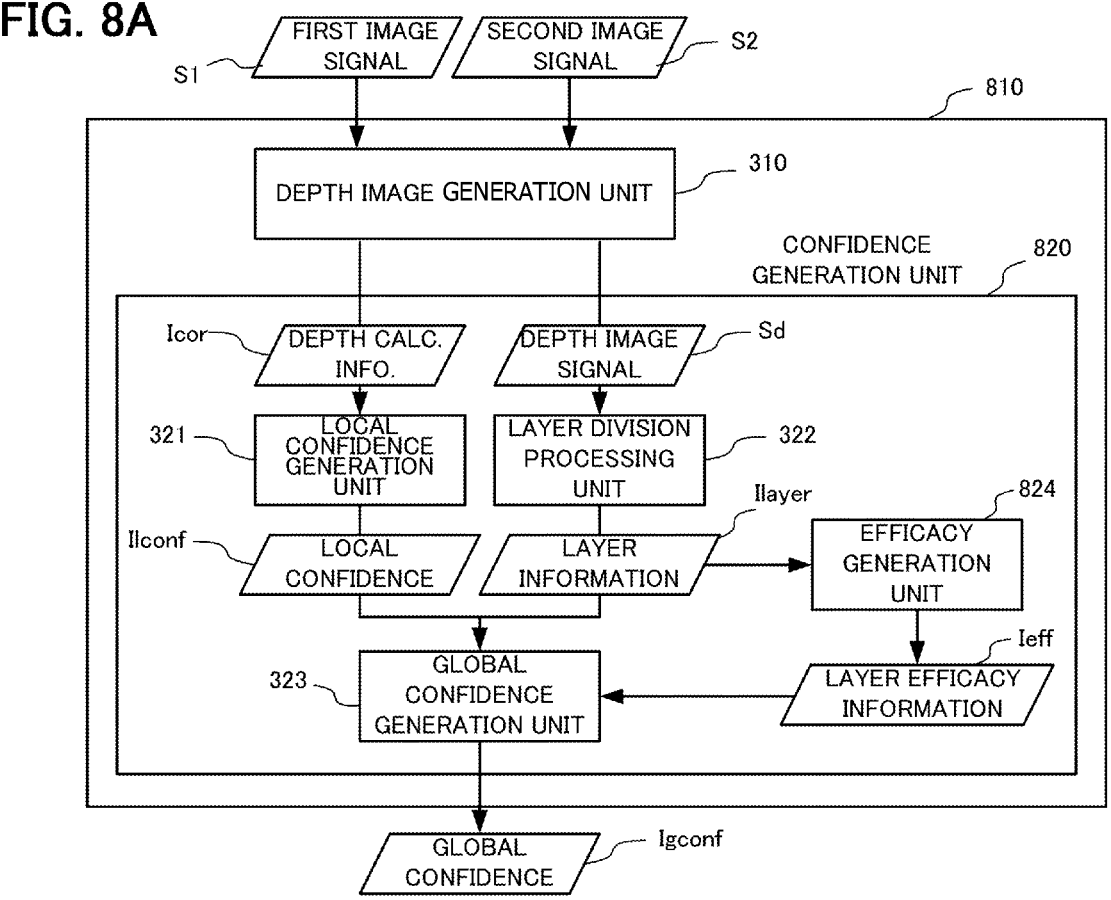
FIGS. 8A and 8B are diagrams depicting a confidence generation apparatus according to Embodiment 2.

FIG. 8A is a block diagram depicting a general configuration of the confidence generation apparatus 810 according to this embodiment. The difference from Embodiment 1

Figure 8B:
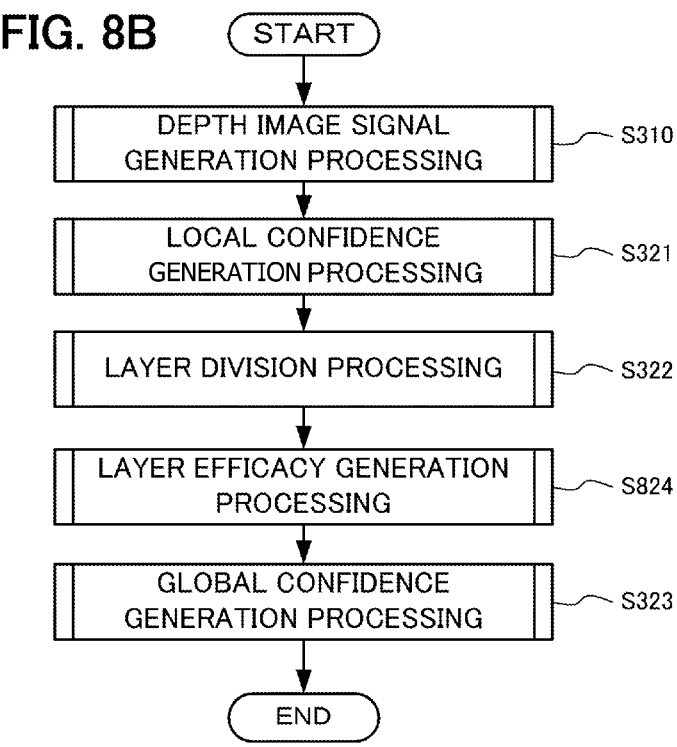

(FIG. 3A) is that an efficacy generation unit (third generation processing unit) 824 for generating the layer efficacy Ieff, which is information to indicate the efficacy of the layer, is added here. FIG. 8B is a flow chart depicting the operation of the confidence generation apparatus 110. The difference from Embodiment 1 is that the layer efficacy Ieff generation processing S824 is added here. In what follows, description on aspects that are the same as Embodiment 1 will be omitted, and aspects that are different from Embodiment 1 will be described.

A confidence generation unit 820 of the confidence generation apparatus 810 additionally includes the efficacy generation unit 824. The efficacy generation unit 824 generates the layer efficacy Ieff based on the layer information Ilayer acquired by the layer division processing unit 322. The global confidence generation unit 323 generates the global confidence Igconf for each layer based on the local confidence Ilconf, the layer information Ilayer, and the layer efficacy Ieff.

The depth image signal generation processing S310, the local confidence generation processing S321, and the layer division processing S322 in FIG. 8B are the same as those of Embodiment 1, hence description thereof will be omitted. In what follows, the layer efficacy generation processing S824, performed by the efficacy generation unit 824, will be described.

In the layer efficacy generation processing S824, the efficacy generation unit 824 generates the layer efficacy Ieff. The content of the concrete processing of the layer efficacy generation processing S824 will be described with reference to FIG. 9A. In step S431, the efficacy generation unit 824 calculates an area Slayer of the layer using the same method as step S431 in FIG. 4D. The area Slayer of the layer has already been calculated in the layer division processing S322. Therefore, the efficacy generation unit 824 may acquire the information based on an area Slayer of the layer from the layer division processing unit 322 as the layer information Ilayer. Then redundant processing can be avoided.

In step S924, the efficacy generation unit 824 generates the layer efficacy Ieff based on the area Slayer of the layer. In concrete terms, the layer efficacy Ieff can be any information based on the ratio of the area Sdist of the depth image signal Sd to the area Slayer of the layer, and can be calculated by the following Expression (4), for example.

$$Ieff = Slayer/Sdist \quad (4)$$

To calculate the area Sdist of the depth image signal Sd, the number of pixels in the depth image signal Sd may be counted, but if the number of pixels to calculate the object depth is determined in advance, a predetermined value may be provided for the area Sdist as well. If the number of pixels to calculate the object depth is determined in advance, the efficacy of the layer can be determined by the area Slayer of the layer alone. Therefore it is not always necessary to calculate the area Sdist of the depth image signal Sd.

FIG. 9B shows the details of the global confidence generation processing S323 performed by the global confidence generation unit 323 of this embodiment. In step S931, the global confidence generation unit 323 determines whether the efficacy of the layer is high or not based on the layer efficacy Ieff acquired from the efficacy generation unit 824 and a provided determination threshold. If it is determined that the efficacy of the layer is high, the global confidence generation unit 323 generates the global confidence Igconf according to the processing content that are the same as FIG. 4D (steps S431 to S433). If it is determined that the efficacy of the layer is low, the global confidence generation unit 323 generates the global confidence Igconf using a provided value.

The confidence generation apparatus 110 of this embodiment includes the efficacy generation unit 824, therefore it can be determined for each layer whether or not it is worth generating the global confidence Igconf. For example, if the layer efficacy Ieff generated using Expression (4) is 0.1, the ratio of the layer to the depth image signal Sd is small. A layer of which ratio to the depth image signal Sd is small has little influence on the entire image. Therefore it is not always necessary to consider the global confidence Igconf therein. In other words, in step S932, the global confidence Igconf can be generated using a provided value which indicates that the global confidence in the layer is high.

For the global confidence generation processing S323 performed by the global confidence generation unit 323, the processing flow shown in FIG. 9C may be used. In the processing flow shown in FIG. 9C, the global confidence Igconf is generated first for each layer, and then the global confidence Igconf, calculated for each layer, is integrated, whereby a representative global confidence Igconf0, which represents the depth image signal Sd, is generated. In other words, the global confidence generation unit 323 generates the global confidence Igconf for each layer in steps S431 to S433, then generates the representative global confidence Igconf0 by integrating the global confidence Igconf for each layer into one confidence value in step S935. For the integration, a statistic of the global confidence Igconf for each plurality of layers (e.g. at least one of: minimum value, maximum value, mean value, median value, standard deviation, variance) can be used. To ensure high robustness as a value which represents the global confidence of the depth image signal Sd as a whole, the statistic to use is preferably the minimum value of the global confidence Igconf calculated for each layer. In other words, it is preferable that the global confidence generation unit 323 generates the representative global confidence Igconf0 using Expression (5) in step S935.

[Math. 1]

$$Igconf0 = \min_{j \in N}(Igconf(j)) \quad (5)$$

Here j in Expression (5) denotes the number of the layer, and N denotes the number of layers divided by the layer division processing unit 322. To integrate the global confidence Igconf using statistic processing, it is preferable to use only the layer of which efficacy was determined as high, based on the layer efficacy Ieff generated by the efficacy generation unit 824. For example, if the layer efficacy Ieff was calculated using Expression (4), the global confidence generation unit 323 generates the representative global confidence Igconf integrated by Expression (5) using only the layers that satisfy layer efficacy Ieff>0.1.

In the description on the confidence generation unit 820 of the confidence generation apparatus 810 of this embodiment, it is assumed that the efficacy generation unit 824 generates the layer efficacy Ieff. However, the layer efficacy Ieff may be generated by the local confidence generation unit 321, since the area Slayer used for generating the layer efficacy Ieff is also used by the local confidence generation unit 321. To calculate the layer efficacy Ieff by the local confidence generation unit 321, the processing in step S924 in the processing flow of FIG. 9C is performed after the step S431 in FIG. 9C, for example.

Modification of Embodiment 2

In the confidence generation apparatus 810 of this embodiment, a plane perpendicular to the optical axis 140 may be divided into a plurality of sub-regions, and the global confidence generation unit 323 may generate the global confidence Igconf for each sub-region and for each layer. By generating the global confidence Igconf for each sub-region and for each layer, the global confidence in the depth image signal Sd can be evaluated for each sub-region and each layer.

Figure 12A:
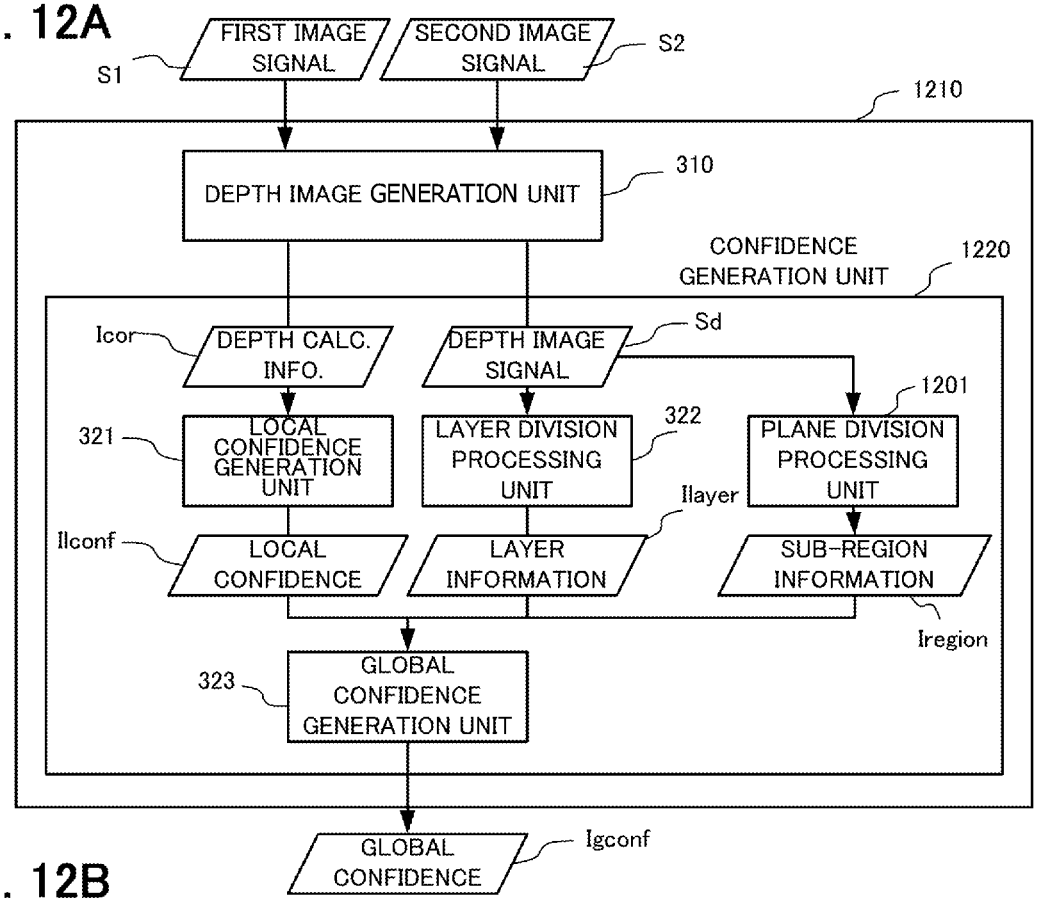
FIGS. 12A to 12C are diagrams depicting a modification of the confidence generation apparatus according to Embodiment 2.
Figure 12B:
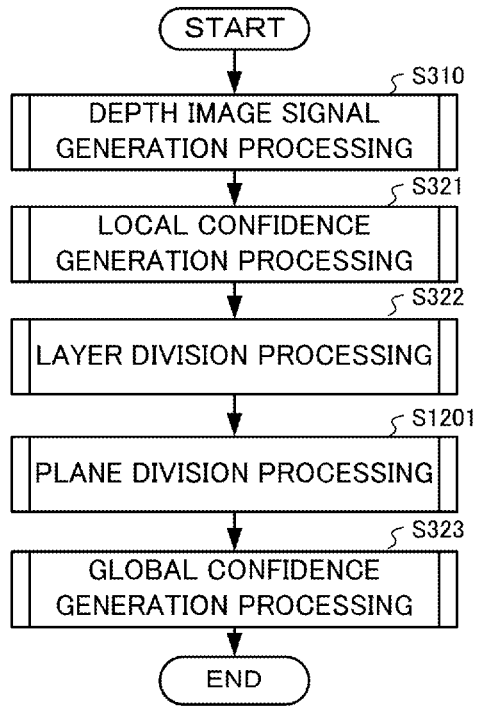

FIG. 12A is a block diagram depicting the general processing of a confidence generation apparatus 1210, further including a plane division processing unit 1201 for generating the sub-region information Iregion. FIG. 12B is a flow chart depicting the operation of the confidence generation apparatus 1210.

The confidence generation unit 1220 of the confidence generation apparatus 1210 further includes the plane division processing unit 1201. The plane division processing unit 1201 generates the sub-region information Iregion using a provided division count. Based on the local confidence Ilconf, the layer information Ilayer and the sub-region information Iregion, and the global confidence generation unit 323 generates the global confidence Igconf for each sub-region and for each layer.

Figure 12C:
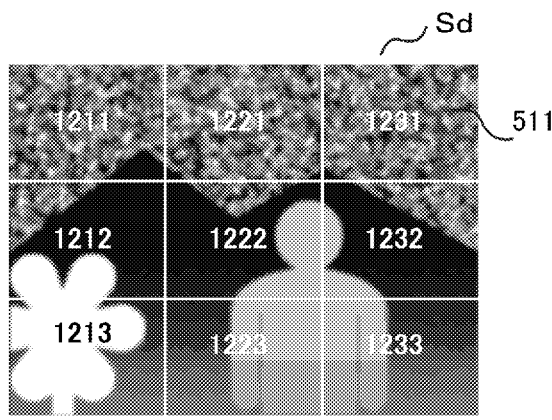

The plane division processing unit 1201 generates the sub-region information Iregion in the plane division processing S1201 in the processing flow shown in FIG. 12B. In the plane division processing S1201, the plane division processing unit 1201 divides the depth image signal Sd into a plurality of sub-regions having predetermined areas respectively, using the provided division count. For example, as shown in FIG. 12C, the plane of the depth image signal Sd is divided into nine sub-regions (sub-regions 1211, 1221, 1231, 1212, 1222, 1232, 1213, 1223 and 1233) using the division count 3×3. The depth image signal Sd in FIG. 12C is a depth image signal Sd in FIG. 5B, for example.

In the example in FIG. 5B, the value of the global confidence Igconf in the foreground/background layer is low, therefore the global confidence in the foreground/background layer is low. If the global confidence generation unit 323 generates the global confidence Igconf for each sub-region and for each layer, the value of the global confidence Igconf becomes low in the sub-regions 1211, 1221 and 1231, as shown in FIG. 12C. In other words, it is known that the global confidence in the depth image signal Sd is low in these sub-regions. In this modification, it is also possible for the global confidence generation unit 323 to generate one representative global confidence Iconf0 for the sub-regions by integrating the global confidence in a plurality of layers for each sub-region using the above mentioned method (FIG. 9C).

In the plane division processing S1201, the depth image signal Sd is divided into a plurality of sub-regions using the provided division count, but the depth image signal Sd may be divided into sub-regions using a known image segmentation method, based on such image characteristic information as the color information and the brightness information. For example, the plane division processing unit 1201 acquires image characteristic information Iimg based on at least one of: the first image signal S1 and the second image signal S2, which were acquired from the depth image generation unit 310 when the depth image signal is generated. Then the plane division processing unit 1201 divides the depth image signal Sd into sub-regions using an image segmentation method based on the image characteristic information Iimg. For the image segmentation method, a graph cut method, for example, can be used. The image characteristic information Iimg may be generated from an ornamental image signal generated by the image generation unit.

This modification to perform the plane division processing can be applied not only to Embodiment 2 but to Embodiment 1 as well.

Embodiment 3

Embodiment 3 of the present invention is an imaging apparatus that includes a correction apparatus configured to generate a corrected depth image signal. The imaging apparatus of this embodiment can be regarded as a depth image signal correction apparatus configured to correct a depth image signal. Embodiment 3 of the present invention will now be described in detail with reference to the drawings. In the following description, a digital camera is used as an example of the imaging apparatus that includes the depth image signal correction apparatus of the present invention, but application of the present invention is not limited to this.

The digital camera 100 of this embodiment is constituted by an imaging optical system 120, an image pickup element 101, a correction apparatus 1000, an image generation unit (not illustrated), a lens driving control unit (not illustrated), and an image signal storage unit (not illustrated), which are disposed inside a camera case 190. In other words, the digital camera 100 of this embodiment has the correction apparatus 1000, instead of the confidence generation apparatus 110 in Embodiment 1 (FIGS. 1A to 1C). The correction apparatus 1000 can be constructed by a logic circuit. As another format, the correction apparatus 1000 may be constituted by a central processing unit (CPU) and a memory to store computing programs.

Figure 10A:
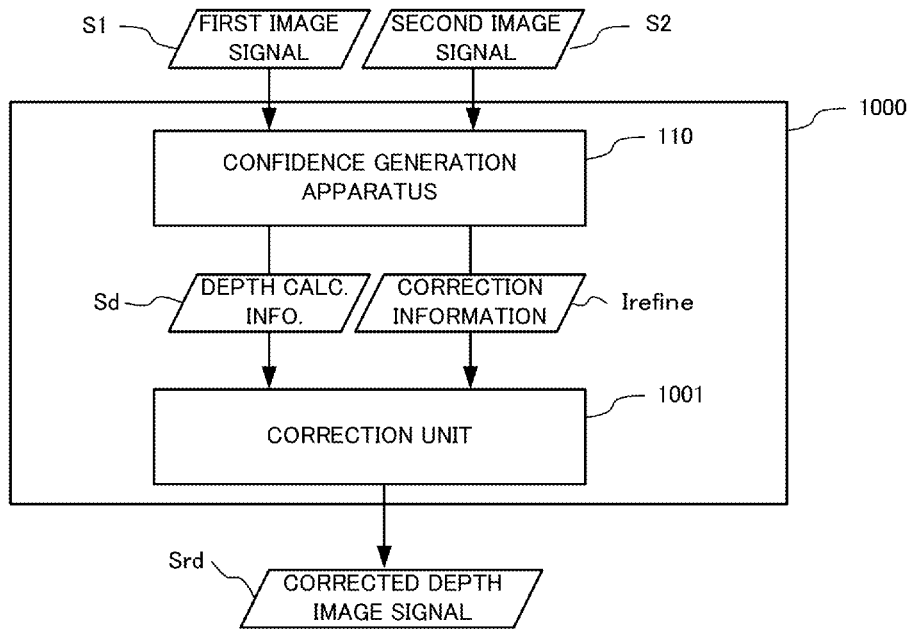
FIGS. 10A to 10C are diagrams depicting an imaging apparatus according to Embodiment 3.

FIG. 10A is a block diagram depicting the general processing of the correction apparatus 1000 of this embodiment. The correction apparatus 1000 reads the first image signal S1 and the second image signal S2 from the image pickup element 101. The confidence generation apparatus 110 generates the depth image signal Sd and the correction information Irefine. A correction unit 1001 receives the depth image signal Sd and the correction information Irefine from the confidence generation apparatus 110, and generates a corrected depth image signal Srd by correcting the depth image signal Sd. In other words, the correction apparatus 1000 generates and outputs the corrected depth image signal Srd.

The correction information Irefine is information for generating the corrected depth image signal Srd, and information that includes at least the global confidence Igconf and the local confidence Ilconf. In the following description, it is assumed that the confidence generation apparatus 110 performs the processing content described with reference to FIGS. 8A and 8B, and the global confidence generation unit 323 performs the processing flow described with reference to FIG. 9C. In other words, the confidence generation apparatus 110 generates and outputs the correction information Irefine that includes the global confidence Igconf generated by integrating the global confidence Igconf in each layer.

Figure 10B:
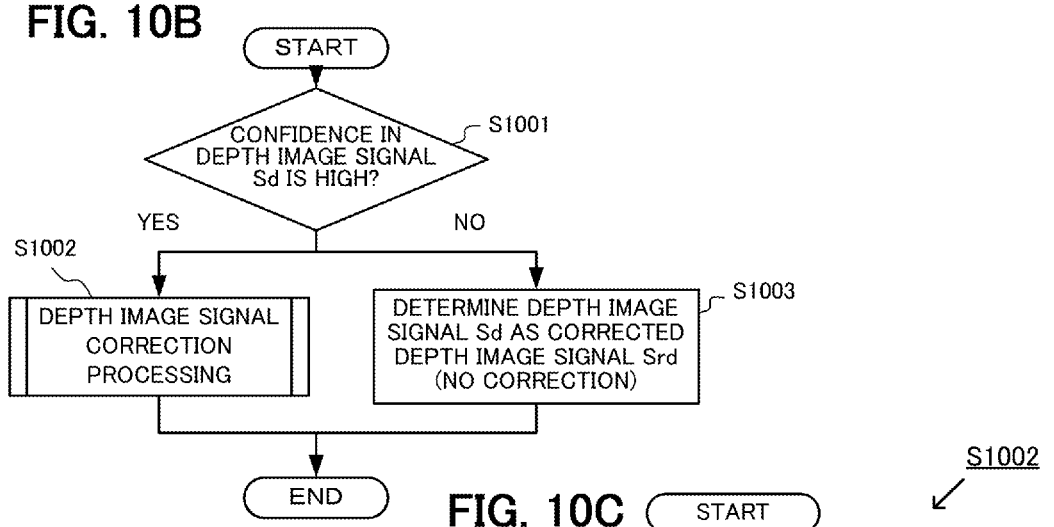

The processing content performed by the confidence generation apparatus 110 is the same as that of Embodiment 1 or 2, hence description thereof will be omitted. The correction unit 1001 generates the corrected depth image signal Srd using the processing flow shown in FIG. 10B. The processing content performed by the correction unit 1001 will be described with reference to the flow chart in FIG. 10B.

In step S1001, the correction unit 1001 determines whether the global confidence in the depth image signal Sd is high or not based on the global confidence Igconf included in the correction information Irefine. For this determination, a provided threshold (predetermined value) can be used. For example, if the confidence is lowest when Igconf=0 and the confidence is highest when Igconf=1, then 0.4 can be used as the threshold. To further increase the stability of the corrected depth image signal Srd, it is preferable that the threshold is higher, such as 0.6. If it is determined that the confidence is high in step S1001, processing advances to step S1002, and if it is determined that the confidence is low, processing advances to step S1003.

Figure 10C:
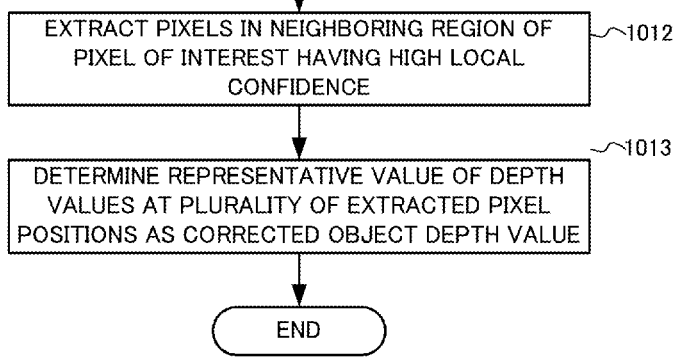

In step S1002, the depth image signal correction processing, to correct the depth image signal, is performed as shown in FIG. 10C. The processing content of the depth image signal correction processing S1002 will be described with reference to FIG. 10C. FIG. 10C shows the processing content performed at a pixel position of interest in the depth image signal Sd. If the object depth is corrected throughout the entire range of the depth image signal Sd, the processing shown in FIG. 10C is performed while sequentially moving the pixel position of interest. In step S1012, the correction unit 1001 calculates the corrected object depth by correcting the object depth. To correct the object depth, a pixel, which is located in a neighboring region of the pixel position of interest and of which local confidence Ilconf is high, is extracted. In step S1013, the correction unit 1001 calculates the representative value of the object depth at the extracted pixel positions (high confidence object depth) as the corrected object depth. In concrete terms, the representative value is a statistic of the high confidence object depth. The representative value is a mean value or a median value, for example. If the size of the neighboring region decreases, the number of pixels that are set as the high confidence object depth decreases, and correction accuracy drops. If the size of the neighboring region increases, on the other hand, it is highly probable that different object depth information is included as the high confidence object depth. Therefore to set the neighboring region, it is preferable that the number of pixels, from one to eight times the collation region which the depth image generation unit 310 uses to calculate the object depth, are included. It is more preferable that the number of pixels, three to five times of the collation region, are included.

In step S1003, the correction unit 1001 directly sets the value of the depth image signals Sd as the value of the corrected depth image signal Srd. In other words, correction is not performed for a layer in which confidence in the depth image signal Sd is determined as low. If the global confidence Igconf, which is a global confidence in the depth image signal Sd, is low, the number of regions in which the object depth may be corrected in error increases, and depth accuracy would drop somewhat by performing correction.

In the imaging apparatus that includes the correction apparatus 1000 of this embodiment, it is determined whether the depth image signal Sd should be corrected or not based on the global confidence Igconf, whereby a drop in accuracy caused by the correction unit 1001 can be minimized, and stability of the corrected depth image signal can be improved.

The correction information Irefine generated by the confidence generation apparatus 110 of this embodiment may further include the image characteristic information Iimg. In other words, as the correction information Irefine, the correction unit 1001 acquires the global confidence Igconf, the local confidence Ilconf, and the image characteristic information Iimg from the confidence generation apparatus 110, and generates and outputs the corrected depth image signal Srd by correcting the depth image signal Sd. The image characteristic information Iimg can be any information representing the image characteristic of the image signal corresponding to the depth image signal Sd, and can be generated from the first image signal S1, for example. The image characteristic information Iimg may be generated from a composite image signal generated by averaging the first image signal S1 and the second image signal S2, or may be generated from the ornamental image signal generated by the image generation unit of the imaging apparatus 100.

If the image characteristic Iimg is included in the correction information Irefine, a condition that the image characteristic is similar to that of the pixel position of interest is added to the conditions to select the high confidence object depth in step S1012 in FIG. 10C. In concrete terms, the correction unit 1001 sets a pixel of interest in the depth image signal, and extracts a pixel which is located in a neighboring region of the pixel of interest, and for which similarity of image characteristic to that of the pixel position of interest is a determination threshold or more, and of which local confidence Ilconf is high. The correction unit 1001 calculates a statistic (mentioned above) of the object depth at an extracted pixel position (high confidence object depth) as the representative value, and sets this representative value for the corrected object depth. To determine the similarity of the image characteristic, the difference of the brightness value from the pixel of interest can be used. In order to select the high confidence object depth more accurately, it is preferable to use the color difference from the pixel of interest. For the color difference, the Euclidian distance or the Manhattan distance in the Lab color space can be used.

A neighboring region of a pixel position of interest of which image characteristic is similar to that of the pixel position of interest, has a high possibility of including a same object as the pixel position of interest. Therefore the corrected depth image signal can be generated more accurately by considering the similarity of the image characteristic as well.

Modification of Embodiment 3

In the above description, it is assumed that the confidence generation apparatus 110 outputs one integrated global confidence Igconf for the depth image signal Sd, but the confidence generation apparatus 110 may output the global confidence Igconf for each layer. In this case, the correction unit 1001 may integrate the global confidence Igconf in each layer, and perform the processing shown in FIGS. 10B and 10C. Or the correction unit 1001 may perform the processing shown in FIGS. 10B and 10C for each layer. If the confidence generation apparatus 110 outputs the representative global confidence Igconf0 by integrating the global confidence Igconf in each layer for each sub-region, the correction unit 1001 performs the processing shown in FIGS. 10B and 10C for each sub-region. If the confidence generation apparatus 110 outputs the global confidence Igconf for each sub-region and for each layer without outputting the representative global confidence Iconf0 for each sub-region, the correction unit 1001 performs the processing shown in FIGS. 10B and 10C for each sub-region and for each layer.

In the above description, correction is not performed if the global confidence Igconf is low (S1001—NO). However, the corrected depth image signal Srd may be acquired using different correction conditions depending on whether the global confidence Igconf is high or low. In concrete terms, correction to generate a major effect (robust correction) is performed if the global confidence Igconf is higher than a predetermined value (high confidence), and correction to generate a minor effect (weak correction) is performed if the global confidence Igconf is lower than the predetermined value (low confidence).

To change the effect of correction, the size of the neighboring region in step S1013 is changed, or the determination threshold to determine the similarity of the image characteristic is changed, or both are performed. In concrete terms, the effect of the correction can be increased as the size of the neighboring region is increased or as the threshold to determine the similarity is decreased. On the other hand, the effect of the correction can be decreased as the size of the neighboring region is decreased or as the determination threshold to determine the similarity is increased.

In the example described here, the correction is performed based on two different correction conditions depending on whether the global confidence Igconf is high or low, but the correction may be performed based on three or more different correction conditions depending on the level of the global confidence Igconf.

Other Embodiments

The present invention can also be implemented by providing a program to implement one or more function(s) of the above embodiments to a system or apparatus via a network or storage medium, and one or more processor(s) of a computer of the system or apparatus reading and executing the program. The present invention can also be implemented by a circuit (e.g. ASIC), which implements one or more function(s).

The examples of the confidence generation apparatus and the correction apparatus described above are all integrated into the imaging apparatus. However, the confidence generation apparatus or the correction apparatus need not be integrated into the imaging apparatus, and may be configured such that the image signals S1 and S2, captured by an external imaging apparatus, are acquired. Further, in the above description, the confidence generation apparatus determines the depth image signal Sd from the image signals S1 and S2, but the confidence generation apparatus may acquire the depth image signal Sd calculated by an external apparatus. In other words, the depth image signal Sd and the depth calculation information Icor (and image signals S1 and S2 depending on the processing content) may be calculated by the confidence generation apparatus or by another apparatus, as long as the confidence generation apparatus can use this information.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-214575, filed on Oct. 30, 2015, and Japanese Patent Application No. 2016-153521, filed on Aug. 4, 2016 which are hereby incorporated by reference herein in their entirety.

What is claimed is:

1. A confidence generation apparatus for generating confidence in a depth distribution, the confidence generation apparatus comprising:
   a memory that stores a program; and
   a processor that executes the program to operate as units comprising:
   (1) an acquisition unit configured to acquire a depth distribution which includes depth information representing a depth to an object in each of a plurality of pixels; and
   (2) a generation unit configured to generate a global confidence which represents confidence in a global region of the depth distribution,
   wherein the generation unit includes:
   (a) a first generation processing unit configured to generate local confidences, each of which represents the confidence of the depth information in a respective one of the plurality of pixels based on statistics of a plurality of pixels;
   (b) a region division processing unit configured to divide the depth distribution into a plurality of regions based on the depth information;
   (c) a region validity generation processing unit configured to generate, for each region divided by the region division processing unit, a region validity indicating an efficacy of the region based on an area of the region; and
   (d) a second generation processing unit configured to generate the global confidence in each of the plurality of regions based on (i) the local confidences and (ii) the region validity.

2. The confidence generation apparatus according to claim 1, wherein the second generation processing unit generates, for each of the plurality of regions, the global confidence based on the ratio of a sum of the local confidences in the region to an area of the region.

3. The confidence generation apparatus according to claim 1, wherein the second generation processing unit generates, for each of the plurality of regions, the global confidence based on the ratio of an area of a part of a region in which the local confidence is a predetermined threshold or higher, to an area of the region.

4. The confidence generation apparatus according to claim 1, wherein the second generation processing unit is further configured to generate one global confidence in the depth distribution from the global confidence in each of the plurality of regions.

5. The confidence generation apparatus according to claim 4, wherein the second generation processing unit is further configured to generate a statistic of the global confidence in each of the plurality of regions, as global confidence in the depth distribution, and
wherein the statistic is any of a minimum value, a mean value, a maximum value, and a standard deviation.

6. The confidence generation apparatus according to claim 1, wherein the region division processing unit is further configured to:
set a plurality of boundary values for performing the region division based on a frequency distribution of the depth information; and
divide the depth distribution into a plurality of regions based on the boundary values.

7. The confidence generation apparatus according to claim 1, wherein the region division processing unit is further configured to:
set boundary values for performing the region division based on (i) a representative value of depth values determined from the depth distribution and (ii) a predetermined size in a depth direction; and
divide the depth distribution into a plurality of regions based on the boundary values.

8. The confidence generation apparatus according to claim 6, wherein the region division processing unit is further configured to set the boundary values on a front side and a rear side of a depth range including a main object, respectively, and to divide the depth distribution into a first region which includes the main object, and a second region which is a region other than the first region, based on the boundary values.

9. The confidence generation apparatus according to claim 6, wherein the region division processing unit is further configured to set the boundary values on a front side and a rear side of a depth range including a main object, respectively, and to divide the depth distribution into a first region which includes the main object, a second region which is on the front side of the first region, and a third region which is on the rear side of the first region, based on the boundary values.

10. The confidence generation apparatus according to claim 9, wherein the region division processing unit is further configured to divide the depth distribution into five regions by disposing a fourth region between the first region and the second region, and disposing a fifth region between the first region and the third region.

11. The confidence generation apparatus according to claim 1, wherein the second generation processing unit is further configured to calculate the global confidence using different methods for a region of which efficacy is determined to be higher than a predetermined value, and for a region of which efficacy is determined to be lower than the predetermined value, based on the region efficacy.

12. The confidence generation apparatus according to claim 1, wherein the second generation processing unit is further configured to generate one global confidence in the depth distribution based on a statistic of the global confidence in regions of which region efficacy is higher than a predetermined value, and
wherein the statistic is any of a minimum value, a mean value, a maximum value, and a standard deviation.

13. The confidence generation apparatus according to claim 1, wherein the generation unit further includes a plane division processing unit configured to generate sub-region information on a plurality of sub-regions generated by dividing a plane perpendicular to a depth direction of the depth distribution, and
wherein the second generation processing unit is further configured to generate the global confidence for each of the sub-regions and for each of the regions, based on at least the local confidences, the region information, and the sub-region information.

14. The confidence generation apparatus according to claim 13, wherein the plane division processing unit is further configured to divide the plane of the depth distribution so that the sub-region has a predetermined region.

15. The confidence generation apparatus according to claim 13, wherein the processor further operates as an image acquisition unit configured to acquire an image signal generated by capturing an object identical to that captured when the depth distribution is generated, and
wherein the plane division processing unit is further configured to divide the plane of the depth distribution into a plurality of sub-regions, based on the similarity of color information or brightness information of the image signal.

16. The confidence generation apparatus according to claim 13, wherein the generation unit further includes a third generation processing unit configured to generate, for each of the regions obtained by division by the region division processing unit, a region efficacy indicating an efficacy of this region based on an area of this region, and
wherein a second generation processing unit is further configured to generate, for each of the sub-regions and for each of the regions, the global confidence in at least one region out of all the regions, based on the region efficacy, the local confidences, and an area of the region.

17. The confidence generation apparatus according to claim 13, wherein the second generation processing unit is further configured to generate, for each of the sub-regions, one global confidence in the sub-region, based on a statistic of the global confidence in regions of which region efficacy is higher than a predetermined value, and
wherein the statistic is any of a minimum value, a mean value, a maximum value, and a standard deviation.

18. A correction apparatus, comprising:
the confidence generation apparatus according to claim 1, wherein the processor further operates as a correction unit configured to correct the depth distribution, and
wherein the correction unit is further configured to correct the depth distribution when the global confidence is higher than a predetermined value, and does not correct the depth distribution when the global confidence is lower than the predetermined value.

19. A correction apparatus, comprising:
the confidence generation apparatus according to claim 1, wherein the processor further operates as a correction unit configured to correct the depth distribution, and wherein, the correction unit is further configured to perform, when the global confidence is lower than a predetermined value, correction of which effect is lower than the case where the global confidence is higher than the predetermined value, on the depth distribution.

20. The correction apparatus according to claim 19, wherein the correction unit is further configured to set a pixel of interest in the depth distribution, and correct the depth information of the pixel of interest by weighting the depth information of surrounding pixels in accordance with the level of confidence of the local confidence, wherein the surrounding pixels are located within a threshold distance from the pixel of interest and has a similarity to the pixel of interest equal to or higher than a determination threshold, the similarity is determined from at least one of the first image signal and the second image signal, and
wherein when the global confidence is lower than the predetermined value, the correction unit increases the determination threshold or decreases a size of the neighboring region compared with the case where the global confidence is higher than the predetermined value.

21. The correction apparatus according to claim 18, wherein the second generation processing unit of the confidence generation apparatus generates one global confidence in the depth distribution from the global confidence in each of the plurality of regions, and
wherein the correction unit corrects the entire depth distribution based on one global confidence in the depth distribution.

22. The correction apparatus according to claim 18, wherein the correction unit corrects, for each of the regions obtained by division by the region division processing unit, the depth distribution based on the global confidence in this region.

23. An imaging apparatus, comprising:
an imaging optical system;
an image pickup element; and
the confidence generation apparatus according to claim 1,
wherein the acquisition unit acquires the depth distribution by calculating the depth distribution based on a first image signal and a second image signal acquired by the image pickup element.

24. A confidence generation method for generating confidence in a depth distribution, executed by a depth image processing apparatus, the method comprising:
an acquisition step of acquiring a depth distribution which includes depth information representing a depth to an object in each of a plurality of pixels; and
a generation step of generating a global confidence which represents confidence in a global region of the depth distribution,
wherein the generation step includes:
(a) a first generation processing step of generating local confidences, each of which represents the confidence of the depth information in a respective one of the plurality of pixels based on statistics of a plurality of pixels;
(b) a region division processing step of dividing the depth distribution into a plurality of regions based on the depth information;
(c) a region validity generation processing step of generating, for each region divided in the region division processing step, a region validity indicating an efficacy of the region based on an area of the region; and
(d) a second generation processing step of generating the global confidence in each of the plurality of regions based on (i) the local confidences and (ii) the region validity.

25. A correction method for correcting a depth distribution, executed by a depth image processing apparatus, the method comprising:
each step of the confidence generation method according to claim 24; and
a correction step of correcting the depth distribution when the global confidence is higher than a predetermined value, and not correcting the depth distribution when the global confidence is lower than the predetermined value.

26. A correction method for correcting a depth distribution, executed by a depth image processing apparatus, the method comprising:
each step of the confidence generation method according to claim 24; and
a correction step of, when the global confidence is lower than a predetermined value, performing correction of which effect is lower than the case where the global confidence is higher than the predetermined value, on the depth distribution.

27. A non-transitory computer-readable medium storing a program to cause a computer to execute each step of a confidence generation method for generating confidence in a depth distribution, executed by a depth image processing apparatus, the method comprising:
an acquisition step of acquiring a depth distribution which includes depth information representing a depth to an object in each of a plurality of pixels; and
a generation step of generating a global confidence which represents confidence in a global region of the depth distribution,
wherein the generation step includes:
(a) a first generation processing step of generating local confidences, each of which represents the confidence of the depth information in a respective one of the plurality of pixels based on statistics of a plurality of pixels;
(b) a region division processing step of dividing the depth distribution into a plurality of regions based on the depth information;
(c) a third generation processing step of generating, for each region divided in the region division processing step, a region validity indicating an efficacy of the region based on an area of the region; and
(d) a second generation processing step of generating the global confidence in each of the plurality of regions based on (i) the local confidences and (ii) the region validity.

* * * * *